United States Patent
Nakano

(10) Patent No.: US 8,375,556 B2
(45) Date of Patent: Feb. 19, 2013

(54) MANUFACTURING METHOD OF GOLF CLUB HEAD

(75) Inventor: Takashi Nakano, Kobe (JP)

(73) Assignee: SRI Sports Limited, Hyogo (JP)

( * ) Notice: Subject to any disclaimer, the term of this patent is extended or adjusted under 35 U.S.C. 154(b) by 382 days.

(21) Appl. No.: 12/762,792

(22) Filed: Apr. 19, 2010

(65) Prior Publication Data
US 2010/0287760 A1    Nov. 18, 2010

(30) Foreign Application Priority Data

May 13, 2009   (JP) .................................. 2009-116171

(51) Int. Cl.
*A63B 53/00* (2006.01)
*B26D 3/06* (2006.01)

(52) U.S. Cl. ................ 29/557; 29/558; 72/373; 72/412; 83/34; 83/56; 83/875; 473/330; 473/331

(58) Field of Classification Search ............. 29/557; 72/373, 412; 83/34, 56, 875; 473/330, 331
See application file for complete search history.

(56) References Cited

U.S. PATENT DOCUMENTS

| | | | | |
|---|---|---|---|---|
| 2002/0132683 A1 * | 9/2002 | Buchanan | ............. | 473/340 |
| 2003/0126734 A1 | 7/2003 | Takeda | | |
| 2007/0149312 A1 | 6/2007 | Gilbert | | |
| 2008/0171613 A1 | 7/2008 | Gilbert et al. | | |
| 2009/0029797 A1 * | 1/2009 | Ban et al. | ............. | 473/331 |
| 2009/0282670 A1 | 11/2009 | Gilbert et al. | | |
| 2009/0298609 A1 | 12/2009 | Gilbert et al. | | |
| 2009/0313806 A1 | 12/2009 | Gilbert | | |

FOREIGN PATENT DOCUMENTS

| | | |
|---|---|---|
| CN | 2865954 Y | 2/2007 |
| JP | 2-77009 U | 6/1990 |
| JP | 3023331 U | 1/1996 |
| JP | 2002-153575 A | 5/2002 |
| JP | 2003-199851 A | 7/2003 |
| JP | 2008-206984 A | 9/2008 |
| JP | 2010-131140 A | 6/2010 |

OTHER PUBLICATIONS

Office Action for corresponding Chinese Patent No. 201010183635.1 dated Aug. 3, 2011 with translation.

* cited by examiner

*Primary Examiner* — Alexander P Taousakis
(74) *Attorney, Agent, or Firm* — Birch, Stewart, Kolasch & Birch, LLP

(57) ABSTRACT

A manufacturing method of the present invention includes the steps of: preparing a pre-line forming member having no face line; and cutting the pre-line forming member using a cutter 12 to form the face line on the pre-line forming member. The cutter 8 has a tip part having a cutting surface. The cutting surface has a recessed curved surface c4. An edge of the face line 8 is cut by the recessed curved surface c4. Preferably, the step of cutting is carried out by axial rotation of the cutter 8. Preferably, the cutting surface has a plane part c5 formed on an upper side of the recessed curved surface c4. Preferably, the upper side plane part c5 is perpendicular to a rotation axis rz of the cutter 12. Preferably, the cutting surface has a conical surface Fc formed on a lower side of the recessed curved surface c4.

16 Claims, 17 Drawing Sheets

MANUFACTURING METHOD OF GOLF CLUB HEAD

This application claims priority on Patent Application No. 2009-116171 filed in JAPAN on May 13, 2009, the entire contents of which are hereby incorporated by reference.

BACKGROUND OF THE INVENTION

1. Field of the Invention

The present invention relates to a manufacturing method of a golf club head having face lines.

2. Description of the Related Art

Face lines are formed on many golf club heads. The face lines can contribute to an increase in the backspin rate (backspin amount) of a hitting ball. The face lines can suppress fluctuation in the backspin rate.

As a forming method of the face lines, press processing and cut processing (machining) have been known. Japanese Patent Application Laid-Open No. 2003-199851 (US2003/126734A1) discloses face lines formed by the press processing. Japanese Patent Application Laid-Open No. 2008-206984 (US2007/0149312A1) discloses face lines formed by the cut processing (machining). Japanese Patent Application Laid-Open No. 2008-206984 describes that a roundness is applied to an edge of a groove by deburring the groove, and that the deburring is attained by a wire brush, a file, or blasting.

SUMMARY OF THE INVENTION

In the case of the cutting processing, an excessively sharp edge is formed. The excessively sharp edge disadvantageously damages a golf ball. The excessively sharp edge may be against the rules. Japanese Patent Application Laid-Open No. 2008-206984 describes that a face surface is polished (buffed) using the wire brush, the file, or the like after the cutting processing, and the edge is rounded by the polishing.

However, it was found that fluctuation in a shape of the edge is apt to occur in the conventional method.

It is an object of the present invention to provide a manufacturing method of a golf club which can suppress fluctuation in the shape of the face line.

A manufacturing method according to the present invention includes the following steps.

(1) preparing a pre-line forming member having no face line; and (2) cutting the pre-line forming member using a cutter to form the face line on the pre-line forming member, The cutter has a tip part having a cutting surface. The cutting surface has a recessed curved surface. An edge of the face line is cut by the recessed curved surface.

Preferably, the step of cutting is carried out by axial rotation of the cutter. Preferably, the cutting surface has a plane part formed on an upper side of the recessed curved surface. Preferably, the upper side plane part is perpendicular to a rotation axis of the cutter.

Preferably, the step of cutting is carried out by axial rotation of the cutter. Preferably, the cutting surface has a conical surface formed on a lower side of the recessed curved surface.

Preferably, the step of cutting is carried out by axial rotation of the cutter. Preferably, an angle θg1 between a line perpendicular to a land area and a generating line of the conical surface is 5 degrees or greater and 45 degrees or less in the step of cutting.

Preferably, the step of cutting is carried out by axial rotation of the cutter. Preferably, the cutting surface has a bottom surface. Preferably, the bottom surface is a plane perpendicular to the rotation axis of the cutter.

Preferably, a curvature radius R1 of a section of the recessed curved surface is 0.06 mm or greater and 0.48 mm or less.

Preferably, when a curvature radius of a section of the recessed curved surface is defined as R1 (mm) and a curvature radius of the edge of the face line is defined as R2 (mm), the curvature radius R1 is greater than the curvature radius R2.

A head having reduced fluctuation in a section shape of a face line can be obtained in the manufacturing method according to the present invention.

DESCRIPTION OF THE PREFERRED EMBODIMENTS

The present invention will be described below in detail based on preferred embodiments with reference to the drawings.

Figure 1:
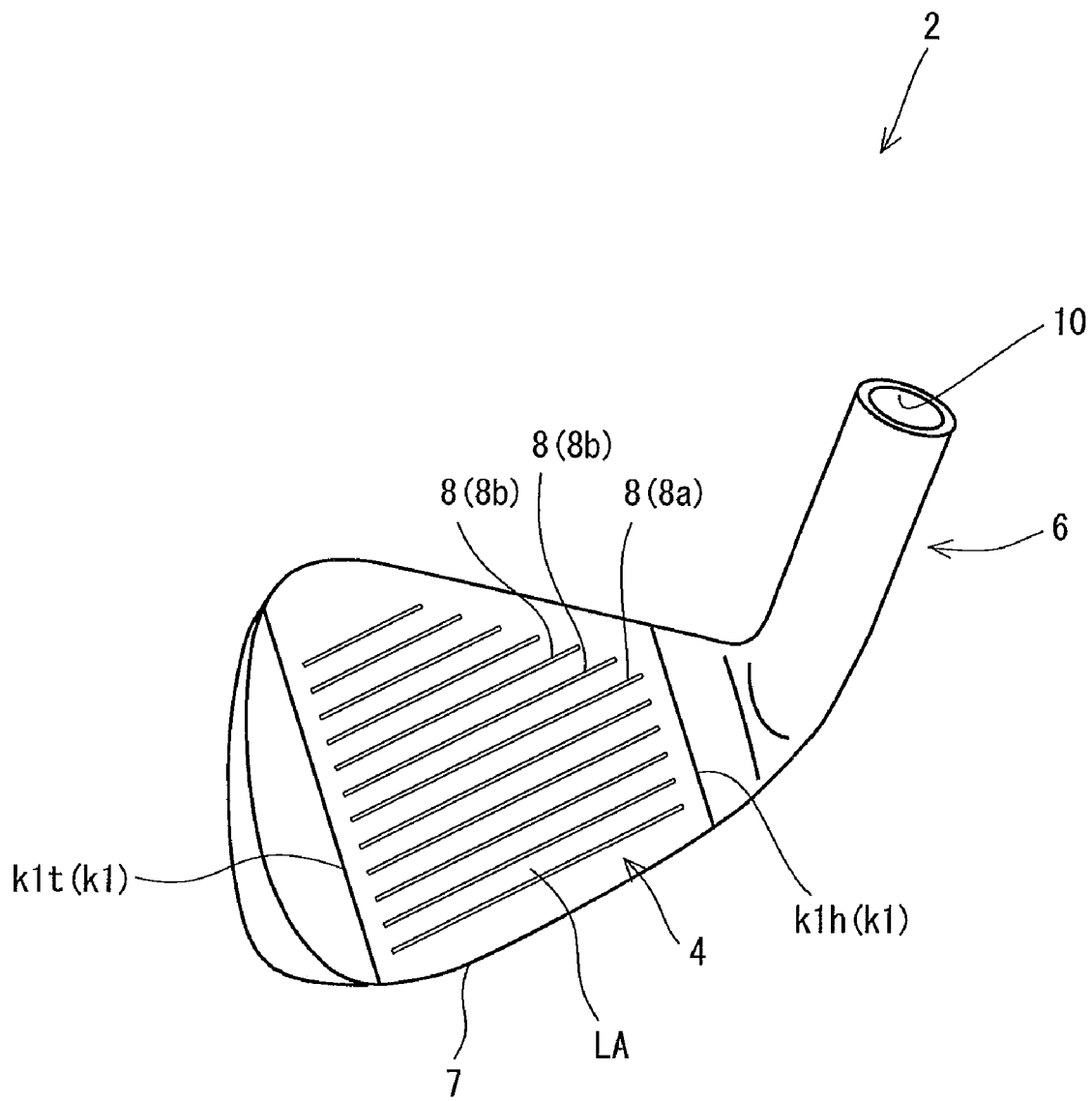
FIG. 1 is a perspective view of a golf club head according to one embodiment of the present invention.
Figure 2:
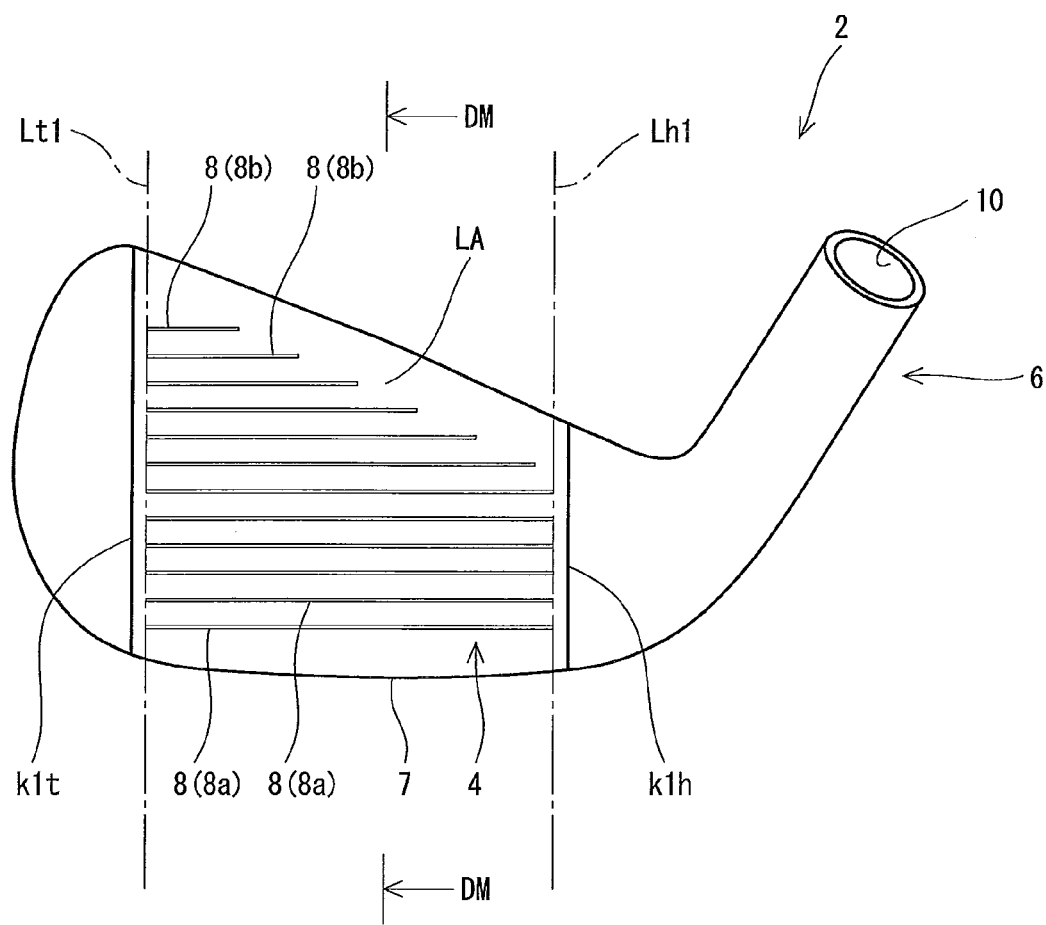
FIG. 2 is a front view of the head of FIG. 1, as viewed from a face side.

As shown in FIGS. 1 and 2, a golf club head 2 is a so-called iron type golf club head. The head is also referred to as an iron head. The head is for right-handed golf players. The golf club head 2 has a face 4, a hosel 6, and a sole 7. The face 4 has a face line 8 formed thereon. The golf club head 2 has a shaft hole 10 to which a shaft is mounted. The shaft hole 10 is formed in the hosel 6.

A material of the head 2 and the face 4 is not restricted. The face 4 may be a metal, or may be a nonmetal. Examples of the metal include iron, stainless steel, maraging steel, pure titanium, and a titanium alloy. Examples of the iron include soft iron (a low carbon steel having a carbon content of less than 0.3 wt %). Examples of the nonmetal include CFRP (carbon fiber reinforced plastic).

The head 2 has the plurality of face lines 8. The face lines 8 are grooves. In the present application, the face lines 8 are also referred to as grooves. The face lines 8 are constituted by the longest lines 8a having the longest length and non-longest lines 8b shorter than the longest lines 8a.

Toe side ends of the longest lines 8a are substantially located on one straight line Lt1 (see FIG. 2). Heel side ends of the longest lines 8a are substantially located on one straight line Lh1 (see FIG. 2). The straight line Lt1 and the straight line Lh1 are shown by a one-dotted chain line in FIG. 2.

Toe side ends of the non-longest lines 8b are substantially located on one straight line Lt1, or are located on the heel side relative to the straight line Lt1. In the head 2 of the embodiment, the toe side ends of all the non-longest lines 8b are substantially located on one straight line Lt1. The toe side ends of the non-longest lines 8b may be located on the heel side relative to the straight line Lt1.

Heel side ends of the non-longest lines 8b are substantially located on one straight line Lh1, or are located on the toe side relative to the straight line Lh1. Usually, the heel side ends of the non-longest lines 8b are located on the toe side relative to the straight line Lh1 as in the embodiment of FIG. 2. The heel side ends of the non-longest lines 8b are located on a line almost along a contour of the face 4. A distance between each of the heel side ends of the non-longest lines 8b and the edge of the face 4 is almost constant.

The face 4 has a land area LA. The land area LA indicates a portion of a surface (face surface) of the face 4 on which the grooves are not formed. If unevenness formed by a shot-blasting treatment to be described later is disregarded, the land area LA is substantially a plane.

A part of the face 4 is subjected to a treatment for increasing a surface roughness. The typical example of the treatment is the shot-blasting treatment. The treatment will be described later. A boundary line k1 between an area which is subjected to the shot-blasting treatment and an area which is not subjected to the shot-blasting treatment is shown in FIGS. 1 and 2. An area between a toe side boundary line k1t and a heel side boundary line k1h is subjected to the shot-blasting treatment. All the face lines 8 are formed in the area which is subjected to the shot-blasting treatment. A toe side area relative to the toe side boundary line k1t is not subjected to the shot-blasting treatment. A heel side area relative to the heel side boundary line k1h is not subjected to the shot-blasting treatment. The toe side boundary line k1t sand the heel side boundary line k1h are visually recognized by the absence or presence of the shot-blasting treatment. The shot-blasting treatment can increase the backspin rate of a ball. The increase in the backspin rate tends to stop the ball near the point of fall. The increase in the backspin rate can facilitate the stopping of the ball at an aiming point. The increase in the backspin rate is particularly useful for a shot targeting a green and an approach shot.

As shown in FIG. 2, the straight line Lt1 and the boundary line k1t are substantially parallel. The straight line Lh1 and the boundary line k1h are substantially parallel. The straight line Lt1, the boundary line k1t, the straight line Lh1 and the boundary line k1h are substantially parallel.

The toe side boundary line k1t is located on the toe side of the straight line Lt1. A distance between the boundary line k1t and the straight line Lt1 is usually about 1 mm or greater and about 3 mm or less.

The heel side boundary line k1h is located on the heel side of the straight line Lh1. A distance between the boundary line k1h and the straight line Lh1 is usually about 1 mm or greater and about 3 mm.

The face surface may be polished before processing of the face lines 8. The face surface of a head 2p before the face lines 8 are formed can be smoothed by polishing the face surface.

Preferably, a treatment for increasing a surface roughness (the shot-blasting treatment described above, or the like) is carried out before processing of the face lines 8. Preferably, the treatment is carried out after polishing of the face surface.

The processing of the face line 8 is carried out after the treatment for increasing the surface roughness. Therefore, the section shape of the face line 8 to be described later is not varied by the treatment for increasing the surface roughness. In the embodiment, the accuracy of the section shape of the face line 8 is enhanced by processing the face line 8 after the treatment for increasing the surface roughness.

Figure 3:
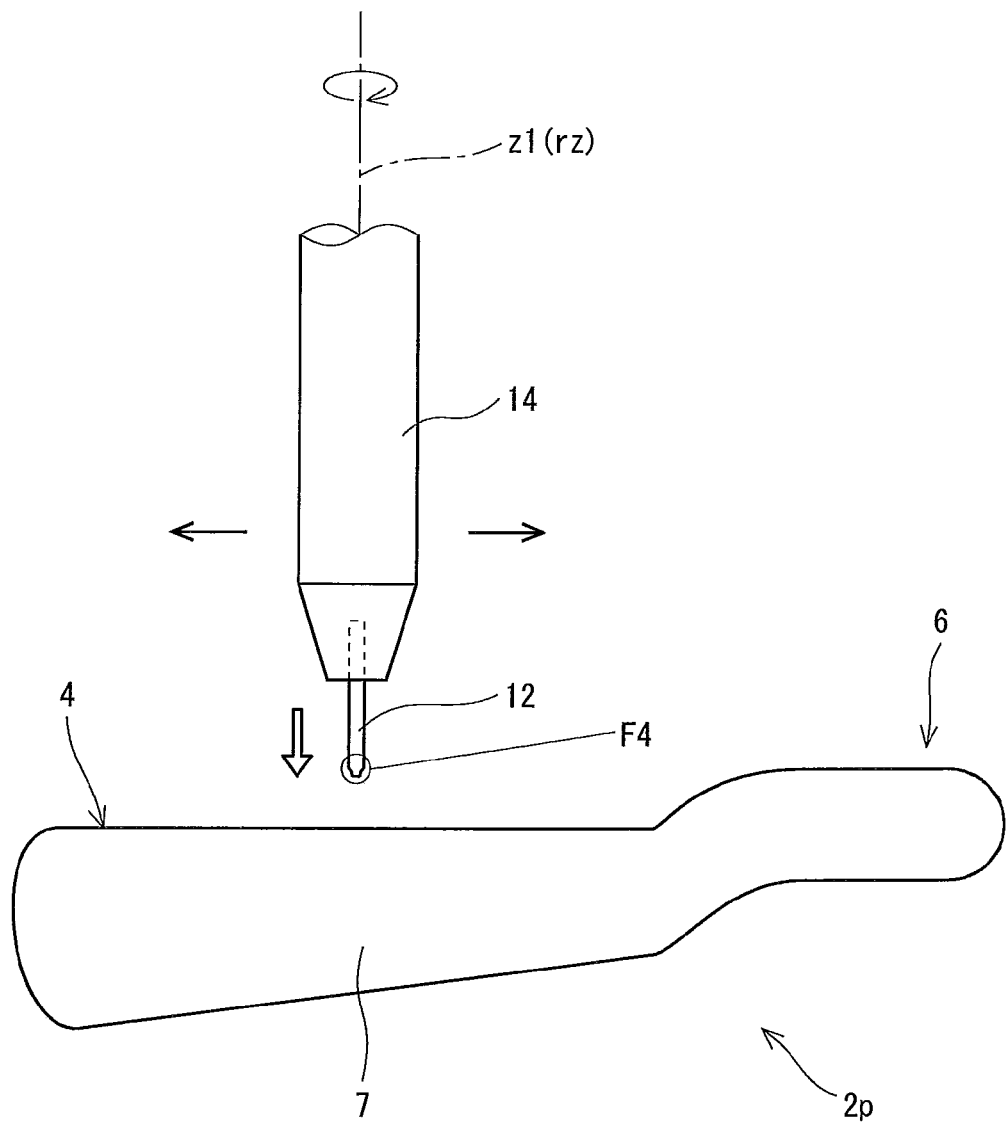
FIG. 3 is a diagram for explaining an example of cut processing of a face line.

FIG. 3 is a diagram showing a condition of a step for processing the face line 8. In the step, first, the head 2p before the face line 8 is formed is prepared. The head 2p is also referred to as a pre-line forming head in the present application. The pre-line forming head is an example of a pre-line forming member. As shown in FIG. 3, the head 2p is fixed with the face 4 horizontally set and faced upward. The head 2p is fixed by a jig, which is not shown.

The face line 8 is formed by carving. In other words, the face line 8 is formed by cutting. The face line 8 is formed by a cutter 12 which is axially rotated.

As shown in FIG. 3, the cutter 12 is fixed to a base part 14. The base part 14 is a part of an NC processing machine (abbreviated in FIG. 3). The cutter 12 is rotated together with the base part 14. A rotation axis rz of the cutter 12 is equal to a central axis line z1 of the cutter 12.

The cutter 12 is axially rotated. The cutter 12 is moved while the axial rotation is maintained. The cutter 12 is moved to a predetermined polish starting position (a position of an end of the face line) (see arrows of FIG. 3). Next, the cutter 12 descends (see an open arrow of FIG. 3). A position in the vertical direction of the cutter 12 during processing is determined according to a predetermined depth (groove depth) of the face line 8. Next, the cutter 12 is moved in the longitudinal direction (an almost toe-heel direction) of the face line (the arrow directions of FIG. 3). The movement follows a straight line. The face 4 is scraped by the movement to form the face line 8. Next, the cutter 12 ascends. Next, the cutter 12 is moved to a polish starting position of another face line 8. Subsequently, these operations are repeated to process the plurality of face lines 8. The cutter 12 is moved based on a program memorized in the NC processing machine (not shown). The face line 8 having the designed depth is formed at the designed position by the cutter 12.

A head obtained by combining a head body with a face plate has been known. Example to be described later is an example thereof. In the head, the head body has an opening. The shape of the opening is equivalent to the contour shape of the face plate. In the head, the face plate is fitted into the opening. In the case of such a head, processing is preferably carried out by the cutter 12 in a state of a simple face plate. In this case, a processed body is easily to be fixed and the face surface is easily to be disposed in a desired direction (for example, horizontally) as compared with the case where the head 2p is processed as shown in FIG. 3. Preferably, the face plate after the cut processing of the face line is carried out is fitted into the head body in such a head. The face plate before the cut processing of the face line is carried out is an example of the pre-line forming member. It may be difficult to fix the face plate (processed body) depending on the shape of the face plate. In the case, after the face plate is fitted into the head body, the face line may be processed by the cutter 12.

In the head in which the face plate is fitted into the head body and the face line is processed, in order to adjust the design of the head, the visibility of the surface, and the like, a part or the whole of the surface of the head, also including the face part on which the face line is formed may be subjected to a surface treatment such as the shot-blasting treatment. However, naturally, the surface treatment may not be carried out.

Figure 4:
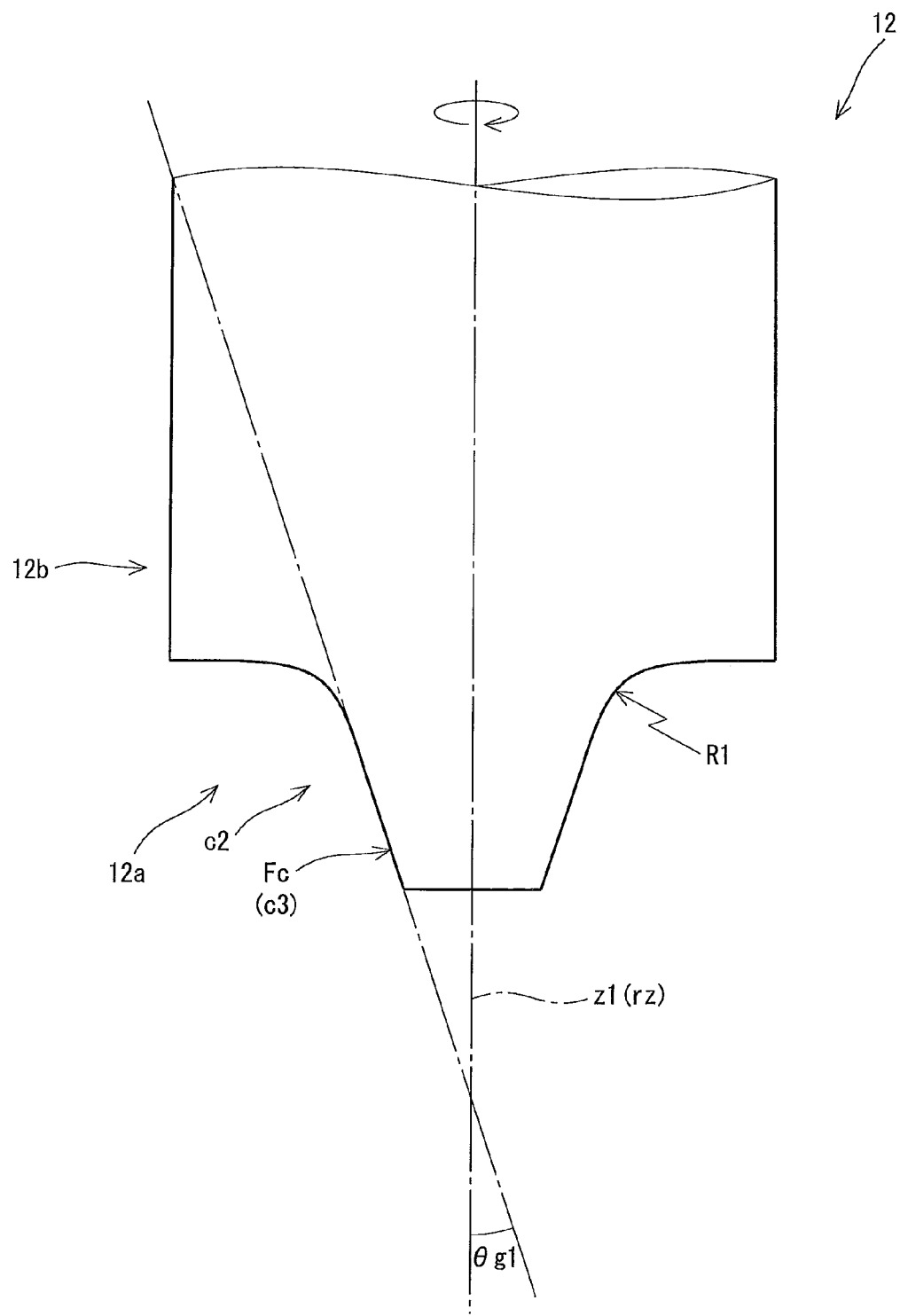
FIG. 4 is an enlarged view of an inside of a circle of FIG. 3, that is, an enlarged view of a tip part of a cutter shown in FIG. 3.

FIG. 4 is an enlarged view of the tip part (inside of a circle of FIG. 3) of the cutter 12. The cutter 12 has a cutting surface 12a and a base body 12b. The base body 12b has a cylindrical shape. At least a part of the cutting surface 12a abuts on the head. At least a part of the cutting surface 12a scrapes the head. Usually, a part of the cutting surface 12a scrapes the head. The base body 12b has a cylindrical shape.

The section of the cutting surface 12a in a section perpendicular to the central axis line z1 has a circular shape. The section shape of the cutting surface 12a formed by a plane containing the central axis line z1 is equal to the shape of a side surface shown in FIG. 4.

As long as there is no especial explanation, "the section of the cutter" in the present application implies a section formed by a plane containing the central axis line z1. As long as there is no especial explanation, "the section of the face line" in the present application implies a section formed by a plane perpendicular to the land area LA and perpendicular to the longitudinal direction of the face line. An example of "the section of the face line" in the present application is a section taken along a line DM-DM of FIG. 2.

Figure 5:
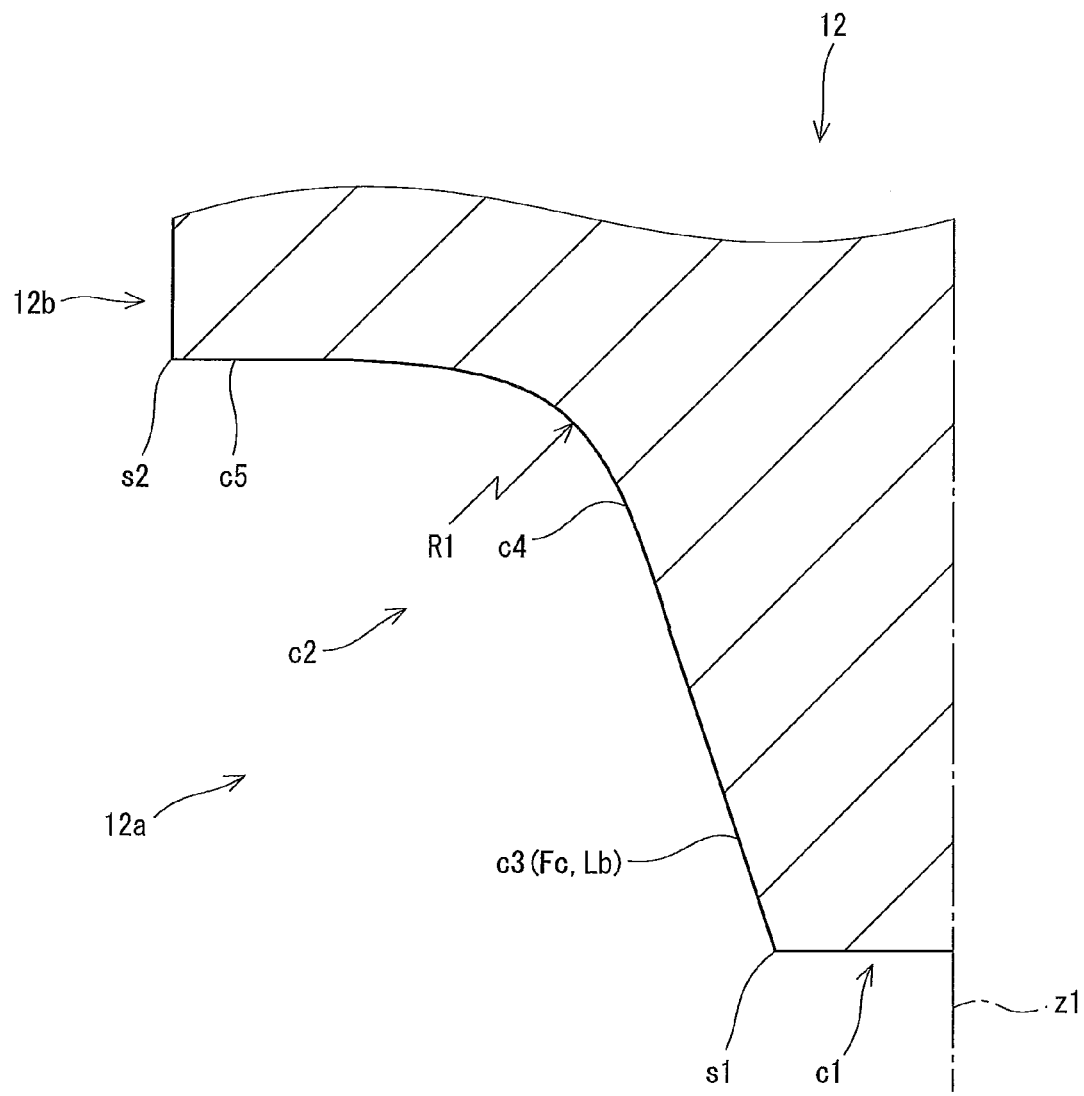
FIG. 5 is a sectional view in which the tip part of the cutter shown in FIG. 4 is further expanded.
Figure 6:
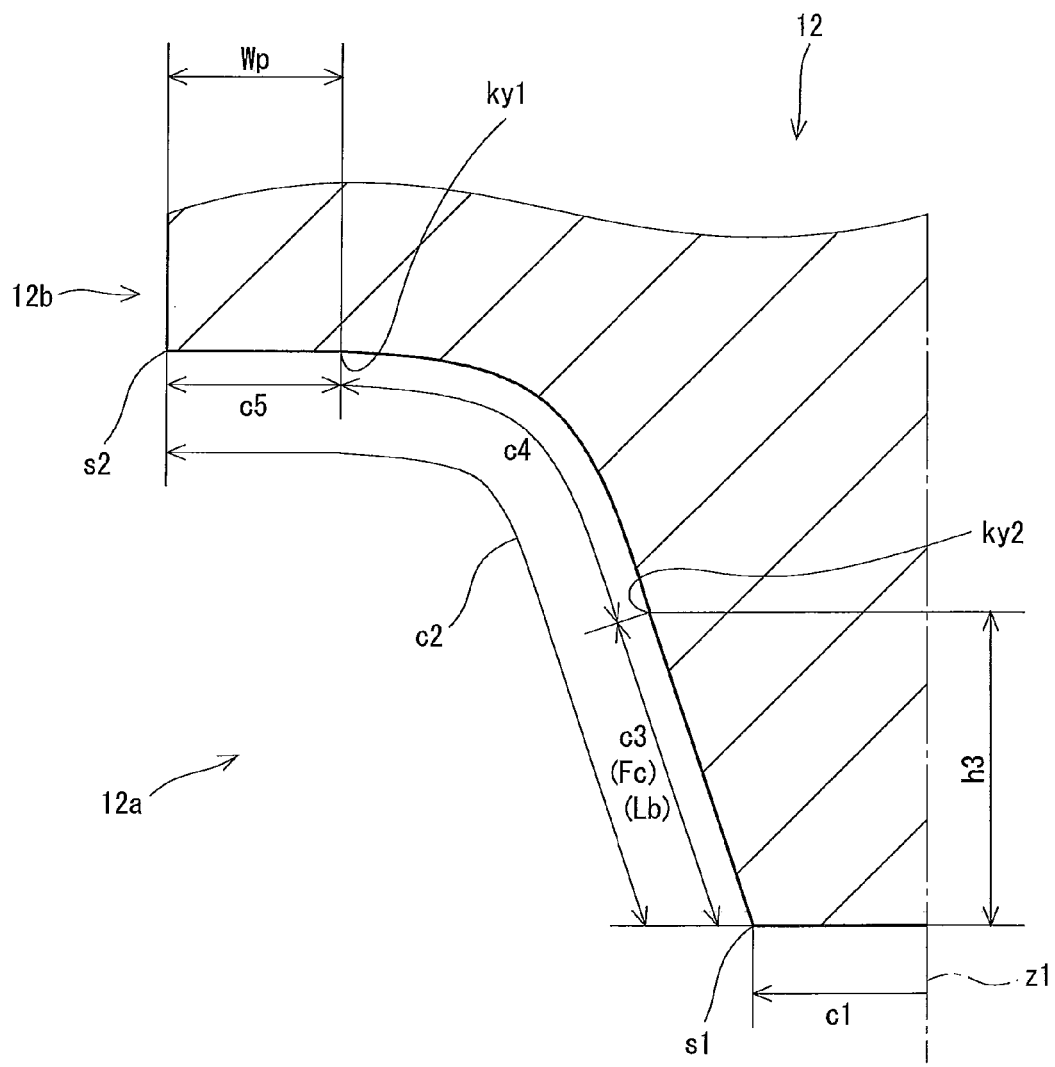
FIG. 6 is a sectional view of the tip part of the cutter shown in FIG. 4 as in FIG. 5.

FIGS. 5 and 6 are sectional views of the tip part of the cutter 12. FIGS. 5 and 6 are sectional views formed by a plane containing the central axis line z1. Since the sectional view of the cutter 12 is axisymmetric about the central axis line z1, only the left side of the central axis line z1 is shown in FIGS. 5 and 6.

As shown in FIG. 5, the cutting surface 12a has a bottom surface c1 and a side surface c2. The side surface c2 is located between the base body 12b and the bottom surface c1. A boundary between the bottom surface c1 and the side surface c2 is a corner s1. A boundary between a side surface of the base body 12b and the side surface c2 is a corner s2.

As shown in FIG. 6, the side surface c2 has a first straight part c3, a curved line part c4, and a second straight part c5. In the cutter 12 of the embodiment, the bottom surface c1 is a plane. In the cutter 12, the bottom surface c1 is a circular plane. The plane is perpendicular to the central axis line z1. The shape of the bottom surface c1 is not restricted. The bottom surface c1 may be a curved surface. The bottom surface c1 may not be perpendicular to the central axis line z1. The bottom surface c1 may be an uneven surface. In respect of enlarging an area A1 (described later) of a transverse plane of the face line 8, the bottom surface c1 is preferably a plane, and more preferably a plane perpendicular to the central axis line z1.

The section of the first straight part c3 is a straight line. The first straight part c3 is a conical surface Fc. The first straight part c3 is a conical protruded surface. The section line of the conical surface Fc is a straight line. The section line of the conical surface Fc is a generating line Lb of the conical surface Fc. The boundary between the conical surface Fc and the bottom surface c1 is the corner s1. In the embodiment, the corner s1 has no roundness. The corner s1 may have a roundness.

The first straight part c3 is also referred to as the conical surface Fc. The conical surface Fc may not be formed. For example, the entire side surface c2 may be the curved line part c4. Comprehensively considering the manufacturing cost of the cutter, the cost of the cut processing, the securement of the area A1 (described later) of the transverse plane of the groove, and the conformity to the rules (described later), it is preferable that the conical surface Fc is formed.

The curved line part c4 is a recessed surface. The recessed surface is a recessed curved surface. The entire recessed curved surface is smoothly continuously formed. The curved line part c4 is also referred to as a recessed curved surface c4. The section of the recessed curved surface c4 is a curve. The shape of the curve is recessed. In other words, the shape of the curve is a protruded shape toward the central axis line z1. The curvature radius of the section of the recessed curved surface c4 may be constant, or may not be constant. More specifically, the section of the recessed curved surface c4 may be a curve formed by connecting lines having a plurality of curvature radii.

The first straight part c3 (conical surface Fc) is located between the recessed curved surface c4 and the bottom surface c1.

The second straight part c5 is a plane. The second straight part c5 is also referred to as an upper side plane part c5. The upper side plane part c5 is a plane part of an upper end of the side surface c2. The upper side plane part c5 is a plane perpendicular to the central axis line z1. The upper side plane part c5 is an annular plane. The upper side plane part c5 is located between the surface of the base body 12b and the recessed curved surface c4. The boundary between the surface of the base body 12b and the upper side plane part c5 is the corner s2 (see FIG. 5).

The conical surface Fc and the recessed curved surface c4 are smoothly continuously formed. The recessed curved surface c4 and the upper side plane part c5 are smoothly continuously formed. The entire side surface c2 is smoothly continuously formed. The side surface c2 may have a portion which is not smoothly continuously formed.

Figure 7:
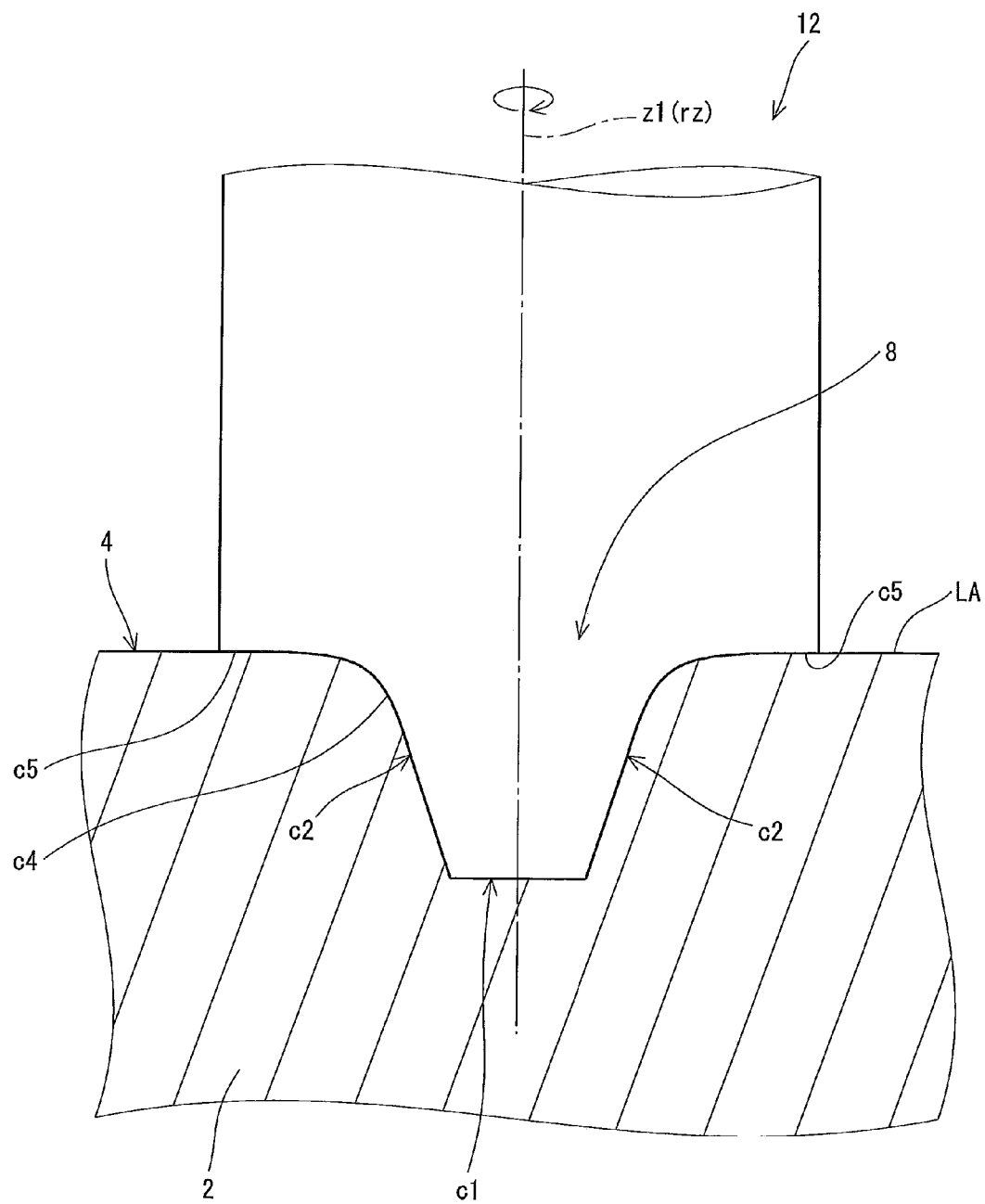
FIG. 7 is a partial sectional view showing one embodiment of cut processing by the cutter shown in FIG. 4.
Figure 8:
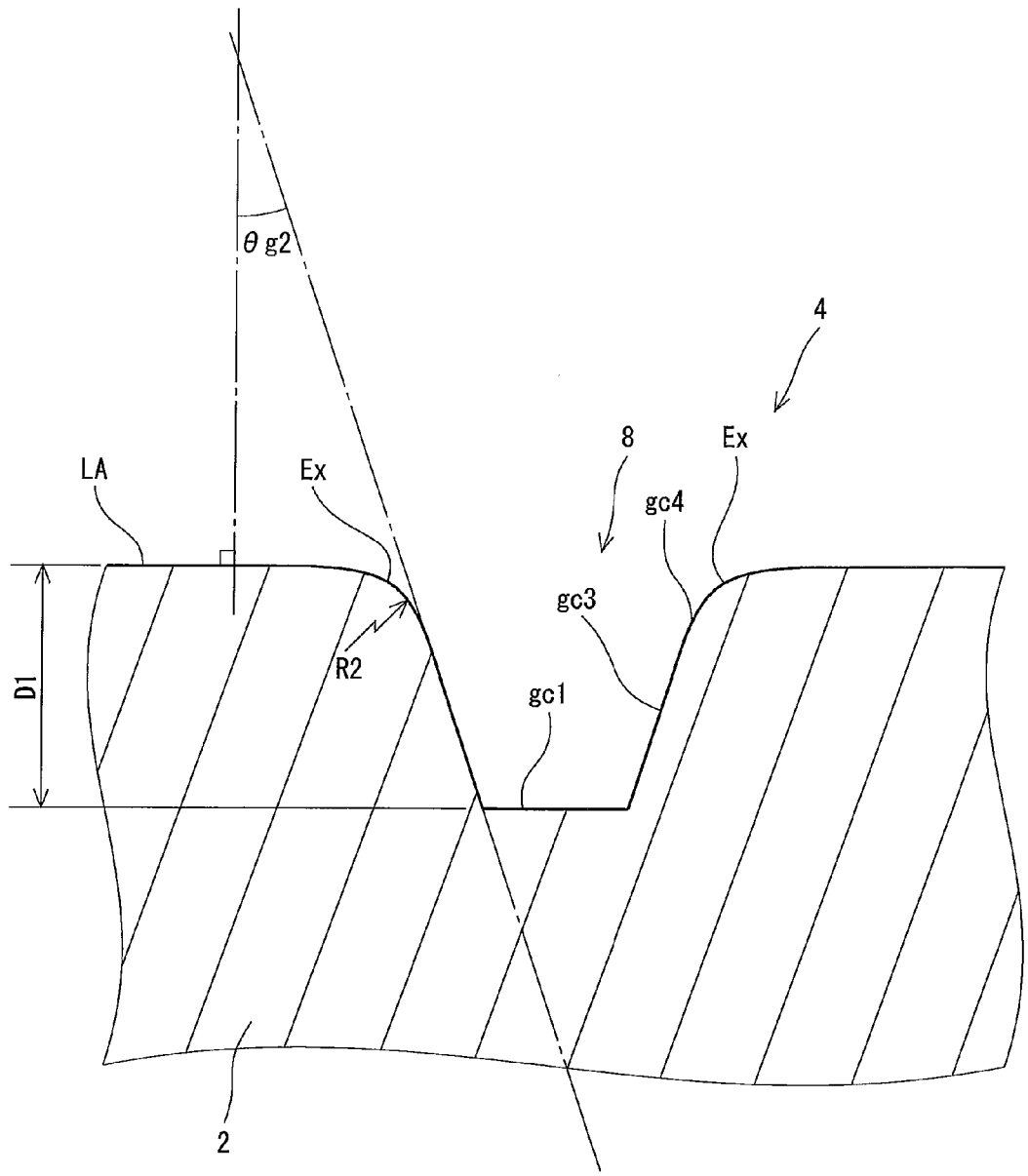
FIG. 8 is a sectional view of a face line formed in the embodiment shown in FIG. 7.

FIG. 7 is a partial sectional view showing a condition in which the head 2 is scraped using the cutter 12. In the embodiment of FIG. 7, the central axis line z1 is perpendicular to the land area LA. FIG. 8 is a sectional view of the face line 8 formed in the embodiment of FIG. 7.

As shown in FIG. 8, the face line 8 has a bottom surface gc1 formed by scraping by the bottom surface c1, a plane inclined part gc3 formed by scraping by the conical surface Fc (first straight part c3), and a protruded curved surface gc4 formed by scraping by the recessed curved surface c4. The whole or a part of the protruded curved surface gc4 is an edge Ex.

In a direction of the central axis line z1 (a direction perpendicular to the land area LA), the position of the land area LA coincides with the position of the upper side plane part c5. In the embodiment, the vertical position of the land area LA coincides with the vertical position of the upper side plane part c5. The land area LA is brought into surface-contact with the upper side plane part c5. The upper side plane part c5 is a reference for positioning the cutter 12. The cutter 12 is positioned so that the upper side plane part c5 abuts on the land area LA. The upper side plane part c5 can enhance the positioning accuracy of the depth-directional position of the cutter 12. The upper side plane part c5 enables the processing of high accuracy.

A width of the upper side plane part c5 is shown by a double-pointed arrow Wp in FIG. 6. The width Wp is measured along the radial direction of the cutter 12. In respect of the processing accuracy, the width Wp is preferably equal to or greater than 0.1 mm, and more preferably equal to or greater than 0.3 mm. In respect of reducing the manufacturing cost of the cutter 12, the width Wp is preferably equal to or less than 5 mm, more preferably equal to or less than 3 mm, and still more preferably equal to or less than 1 mm.

In the present invention, the upper side plane part c5 may not be present. As described above, in respect of the processing accuracy, it is preferable that the upper side plane part c5 is present.

The edge Ex is formed as a smooth curved surface by cut processing with the upper side plane part c5 abutting on the land area LA. The smooth curved surface is less likely to damage the ball.

As shown in FIG. 6, the recessed curved surface c4 and the upper side plane part c5 are smoothly continuously formed at a boundary line ky1 between the recessed curved surface c4 and the upper side plane part c5. The recessed curved surface c4 and the upper side plane part c5 may not be smoothly continuously formed at the boundary line ky1. In respect of obtaining the face line hardly damaging the ball, it is preferable that the recessed curved surface c4 and the upper side plane part c5 are smoothly continuously formed at the boundary line ky1.

The conical surface Fc and the recessed curved surface c4 may not be smoothly continuously formed at a boundary line ky2 between the conical surface Fc and the recessed curved surface c4. In respect of obtaining the face line hardly damaging the ball, it is preferred that conical surface Fc and recessed curved surface c4 are smoothly continuously formed at the boundary line ky2.

The face line 8 having the edge Ex to which the roundness is applied is formed by the recessed curved surface c4. Since the edge Ex is formed by the cut processing, it is not necessary to carry out the step of rounding the edge after the cut processing. The edge has been conventionally rounded by polishing using a brush or the like after the cut processing. However, it was found that the method causes large fluctuation in roundness of the edge. The embodiment can suppress the fluctuation in roundness of the edge Ex. In respects of suppressing the fluctuation in roundness and of simplifying the step, it is preferable that the step for rounding the edge is not carried after the cut processing.

Figure 9:
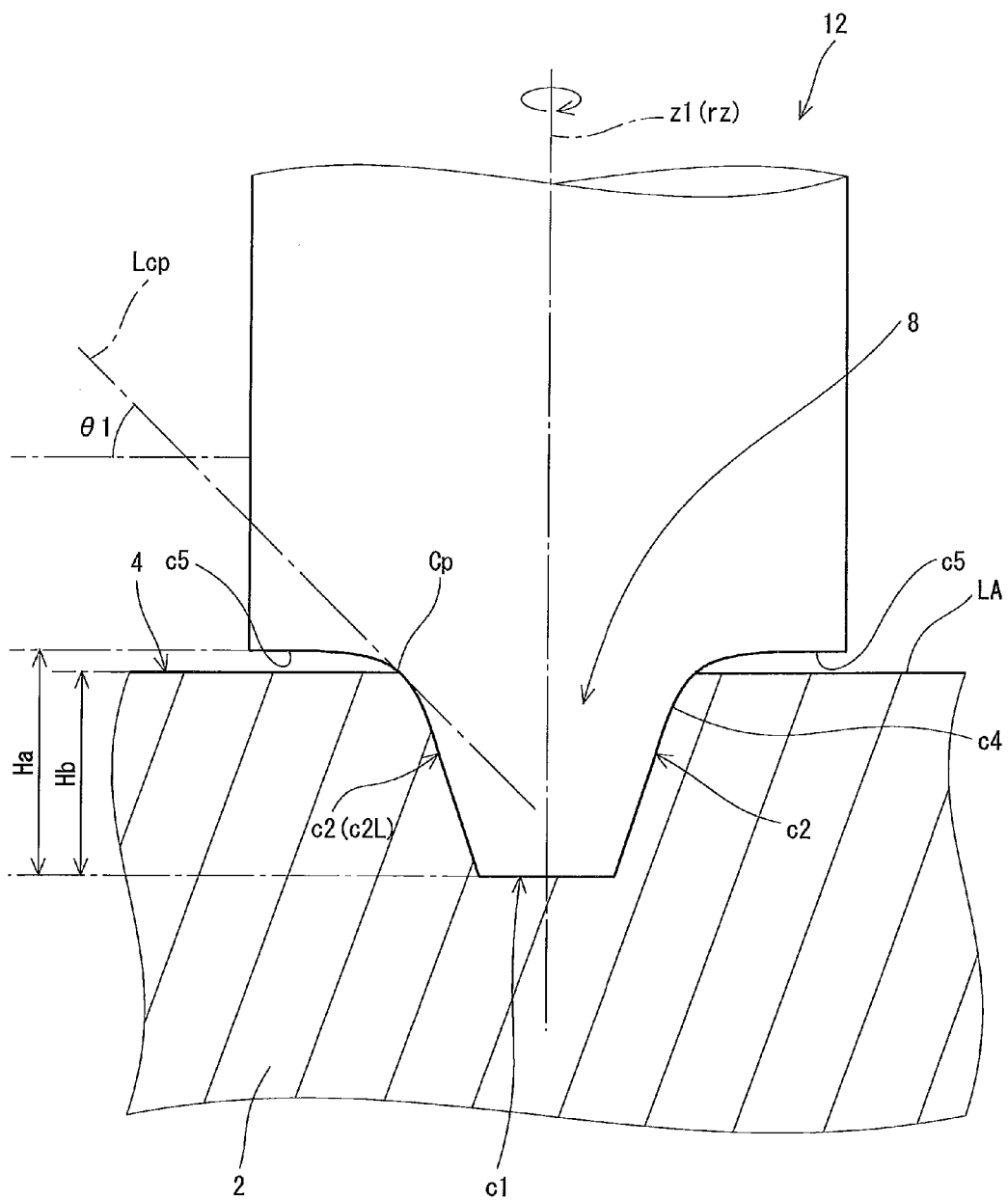
FIG. 9 is a partial sectional view showing another embodiment of cut processing by the cutter shown in FIG. 4.
Figure 10:
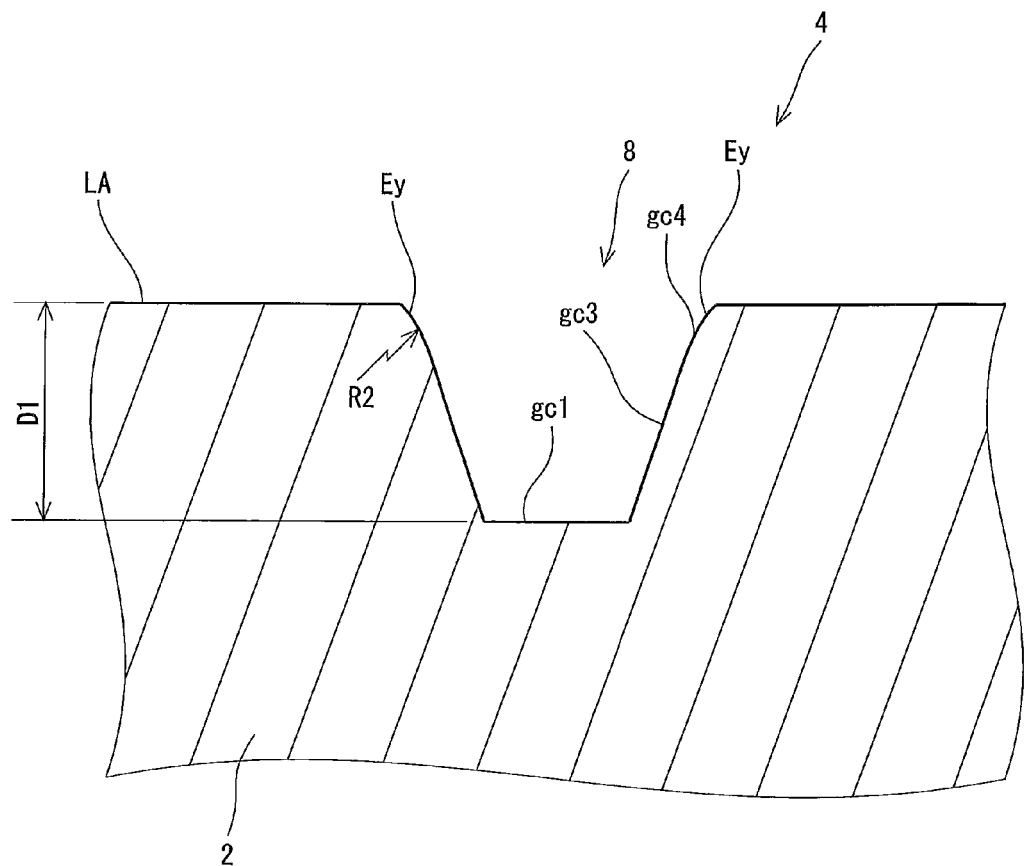
FIG. 10 is a sectional view of a face line formed in the embodiment shown in FIG. 9.

FIG. 9 is a partial sectional view showing a condition in which the head 2 is scraped by the cutter 12. In the embodiment of FIG. 9, the central axis line z1 is perpendicular to the land area LA. FIG. 10 is a sectional view of the face line 8 formed in the embodiment of FIG. 9.

As shown in FIG. 10, the face line 8 has the bottom surface gc1 formed by scraping by the bottom surface c1, the plane inclined part gc3 formed by scraping by the conical surface Fc (first straight part c3), and the protruded curved surface gc4 formed by scraping by the recessed curved surface c4. A part of the protruded curved surface gc4 is an edge Ey.

When the embodiment of FIG. 9 is compared with the embodiment of FIG. 7, the cutter 12 is the same in both the embodiments. However, there is a difference between the embodiment of FIG. 9 and the embodiment of FIG. 7. The difference is the absence or presence of a clearance between the upper side plane part c5 and the land area LA. In the embodiment of FIG. 9, the clearance is present between the upper side plane part c5 and the land area LA. A distance of the clearance is (Ha-Hb) (see FIG. 9). The distance (Ha-Hb) can serve as the reference for positioning the cutter 12. The upper side plane part c5 is effective as the reference for positioning. The setting can enhance the processing accuracy of the face line 8.

As shown in FIG. 10, the edge Ey is rounded. Although the edge Ey is not so smooth as the edge Ex (see FIG. 8) described above, the edge Ey is rounded. The roundness suppresses the damage of the ball.

An axial-directional distance of the side surface c2 is shown by a double-pointed arrow Ha in FIG. 9. The distance Ha is measured along the central axis line z1. A distance between the tip of the cutter 12 and the land area LA during cut processing is shown by a double-pointed arrow Hb in FIG. 9. The distance Hb is measured along the central axis line z1.

In respects of suppressing the damage of the ball and of the conformity to the rules, (Hb/Ha) is preferably equal to or greater than 0.8, more preferably equal to or greater than 0.9, still more preferably equal to or greater than 0.95, and most preferably 1.0.

An intersection Cp of the section line of the land area LA and a section line c2L is shown in FIG. 9. The section line c2L is a section line of the side surface c2. A tangent of the section line c2L at the intersection Cp is shown by a one-dotted chain line Lcp in FIG. 9.

An angle between the tangent Lcp and the section line of the land area LA is shown by θ1 in FIG. 9. In respects of suppressing the damage of the ball and of the conformity to the rules, the angle θ1 is preferably equal to or less than 10 degrees, more preferably equal to or less than 5 degrees, and still more preferably equal to or less than 2 degrees.

Also in the embodiment of FIG. 9, the face line 8 having the edge Ey to which the roundness is applied is formed by the recessed curved surface c4 (see FIG. 10). Since the edge Ey is formed by the cut processing, it is not necessary to round the edge after the cut processing. Therefore, the fluctuation in roundness of the edge Ey is suppressed.

When the fluctuation in roundness of the edge is large, a head having an insufficient roundness or a head having an excessive roundness may be produced. The head having the insufficient roundness is apt to damage the ball. The head having the excessive roundness is apt to reduce the stability of the spin amount in, particularly, wet. Namely, the spin amount (particularly, backspin rate) is apt to be fluctuated under the condition in which water is present between the ball and the face. The spin amount (particularly, backspin rate) is apt to be fluctuated even under the condition in which grass is present between the ball and the face. These drawbacks are suppressed by suppressing the fluctuation in the roundness of the edge.

In respect of the conformity to the golf rules, the size of the section shape of the face line is restrained. When the conformity to the golf rules was considered in the case where the fluctuation in roundness was large, it was necessary to set a design value which has flexibility for the tolerance level on the rules. When the fluctuation was large, the desired value (design value) of the roundness of the edge needed to have flexibility for the limit on the rules. Therefore, regarding the medium value and the average value of roundnesses of edges in mass-produced products, the curvature radius of the edge was set larger than the limit on the rules. The design value can be brought close to the limit value of restriction on the rules by enhancing the dimensional accuracy of the roundness of the edge. The enhancement of the dimensional accuracy of the edge can enhance the degree of freedom of design while maintaining the conformity to the golf rules. The enhancement of the dimensional accuracy of the edge enables manufacturing of a golf club head having excellent backspin performance while maintaining the conformity to the golf rules. The golf rules related to the face line will be described later.

A depth (groove depth) of the face line is shown by a double-pointed arrow D1 in FIG. 10 or the like. An axial directional length of the conical surface Fc is shown by a double-pointed arrow h3 in FIG. 6. The length h3 is measured along the central axis line z1.

In respects of suppressing the excessive roundness of the edge and of enhancing the backspin performance, a ratio (h3/D1) of the length h3 (mm) to the groove depth D1 (mm) is preferably equal to or greater than 0.4, more preferably equal to or greater than 0.45, and still more preferably equal to or greater than 0.5. In respects of suppressing the insufficient roundness and of suppressing the damage of the ball, the ratio (h3/D1) is preferably equal to or less than 0.9, more preferably equal to or less than 0.85, and still more preferably equal to or less than 0.8.

The curvature radius R1 of the section (the section formed by the plane containing the central axis line z1) of the recessed curved surface c4 is not restricted. The curvature radius R1 is also referred to as "the curvature radius R1 of the cutter". In respect of setting the curvature radius R2 to be described later to a preferred value, the curvature radius R1 of the cutter is preferably equal to or greater than 0.06 (mm), more preferably equal to or greater than 0.10 (mm), and still more preferably equal to or greater than 0.15 (mm). In respect of setting the curvature radius R2 to be described later to a preferred value, the curvature radius R1 is preferably equal to or less than 0.48 (mm), more preferably equal to or less than 0.45 (mm), and still more preferably equal to or less than 0.40 (mm).

A curvature radius of the edge of the face line 8 is shown by R2 in FIGS. 8 and 10. As shown in examples to be described later, it was found that the curvature radius R2 of the edge does not necessarily agrees with the curvature radius R1 of the cutter. The reason for the disagreement is unknown. Specifically, it was found that the curvature radius R1 of the cutter is apt to be greater than the curvature radius R2 of the edge.

It was found that it is important to design the curvature radius R1 of the cutter based on the new finding of the disagreement of the curvature radius R1 and the curvature radius R2. In respect of bringing the curvature radius R2 of the edge close to the design value as much as possible, it was found that it is important to consider the disagreement of the curvature radius R1 and the curvature radius R2.

The disagreement of the curvature radius R1 and the curvature radius R2 can serve as an effective finding for combining the conformity to the rules and the backspin performance. A design for reducing the curvature radius R2 of the edge as much as possible within a range allowable in the rules is attained by considering the disagreement. The small curvature radius R2 of the edge can contribute to the backspin performance.

As described above, the rigid rules for the shape of the groove are defined. It was found that it is important to consider the disagreement of the curvature radius R1 and the curvature radius R2 in respect of obtaining the face line having high spin performance while conforming the shape of the groove to the rules. The consideration of the disagreement enables the setting of the design value (barely targeting the standard) nearer to the limit of the range of the rules as compared with the conventional technique. Therefore, the design value of the curvature radius R2 in the mass-produced product can be further reduced while the design value is conformed to the rules. The curvature radius R2 which is smaller and has few fluctuation enhances the spin performance.

In respect of enhancing the conformity to the rules and of suppressing the damage of the ball, the curvature radius R2 of the edge is preferably equal to or greater than 0.02 (mm), more preferably equal to or greater than 0.06 (mm), and still more preferably equal to or greater than 0.10 (mm). In respect of the conformity to the rules, the curvature radius R2 of the edge is preferably equal to or less than 0.44 (mm), more preferably equal to or less than 0.40 (mm), and still more preferably equal to or less than 0.36 (mm).

The curvature radius R2 of the edge may be constant, or may be varied. When the curvature radius R2 (mm) is varied, the lower limit value of the variation is defined as R21 (mm), and the upper limit value of the variation is defined as R22 (mm). In respect of setting the curvature radius R2 of the edge to a preferred value, the lower limit value R21 of the variation is preferably equal to or greater than 0.02 (mm), more preferably equal to or greater than 0.06 (mm), and still more preferably equal to or greater than 0.10 (mm). In respect of setting the curvature radius R2 of the edge to a preferred value, the upper limit value R22 is preferably equal to or less than 0.44 (mm), more preferably equal to or less than 0.40 (mm), and still more preferably equal to or less than 0.36 (mm).

In respect of bringing the curvature radius R2 actually obtained close to the design value (desired value) as much as possible, a difference (R1-R2) between the curvature radius R1 of the cutter (mm) and the curvature radius R2 of the edge (mm) is preferably equal to or greater than 0.01 (mm), more preferably equal to or greater than 0.02 (mm), and still more preferably equal to or greater than 0.03 (mm). In respect of bringing the curvature radius R2 actually obtained close to the design value, the difference (R1-R2) is preferably equal to or less than 0.06 (mm), more preferably equal to or less than 0.05 (mm), and still more preferably equal to or less than 0.04 (mm).

The curvature radius R1 of the cutter may be constant in the entire recessed curved surface, or may be varied in the recessed curved surface. When the curvature radius R1 (mm) is varied, the lower limit value of the variation is defined as R11 (mm), and the upper limit value of the variation is defined as R12 (mm). In respect of setting the curvature radius R2 of the edge to a preferred value, the lower limit value R11 of the variation is preferably equal to or greater than 0.06 (mm), more preferably equal to or greater than 0.10 (mm), and still more preferably equal to or greater than 0.15 (mm). In respect of setting the curvature radius R2 of the edge to a preferred value, the upper limit value R12 of the variation is preferably equal to or less than 0.48 (mm), more preferably equal to or less than 0.45 (mm), and still more preferably equal to or less than 0.40 (mm).

In respect of bringing the curvature radius R2 actually obtained close to a curvature radius R3 of the design value as much as possible, a difference (R1-R3) between the curvature radius R1 (mm) of the cutter and the curvature radius R3 (mm) of the design value of the edge is preferably equal to or greater than 0.01 (mm), more preferably equal to or greater than 0.02 (mm), and still more preferably equal to or greater than 0.03 (mm). In respect of bringing the curvature radius R2 actually obtained close to the design value R3 as much as possible, the difference (R1−R3) is preferably equal to or less than 0.06 (mm), more preferably equal to or less than 0.05 (mm), and still preferably equal to or less than 0.04 (mm).

The preferred value of the curvature radius R3 of the design value is equal to the preferred value of the curvature radius R2 of the edge described above.

An angle between a straight line perpendicular to the land area LA and the plane inclined part gc3 is shown by θg2 in FIG. 8. The angle θg2 is measured in the section of the face line 8. The angle θg2 is also referred to as a groove angle θg2 in the present application.

When a groove width W1 is excessively narrow or the groove angle $\theta g2$ is near 0 degree, the face line 8 is apt to be clogged with soil or grass. The clogging of the soil or grass reduces the backspin rate of the ball. The clogging of the soil or grass reduces the stability of the spin amount. In these respects, the groove angle $\theta g2$ is preferably equal to or greater than 5 degrees, more preferably equal to or greater than 7 degrees, and still more preferably equal to or greater than 10 degrees. When the angle of the edge is excessively large, the spin amount of the ball is reduced. In respect of increasing the spin amount, the groove angle $\theta g2$ is preferably equal to or less than 45 degrees, more preferably equal to or less than 40 degrees, and still more preferably equal to or less than 35 degrees.

An angle between the central axis line z1 and the conical surface Fc (first straight part c3) is shown by $\theta g1$ in FIG. 4. The angle $\theta g1$ is measured in a section formed by a plane containing the central axis line z1. In the present application, the angle $\theta g1$ is also referred to as an cutter angle. The angle $\theta g1$ is also an angle between a line perpendicular to the land area LA and the generating line of the conical surface Fc in a cutting step.

In respect of setting the groove angle $\theta g2$ to the preferred value, the cutter angle $\theta g1$ is preferably equal to or greater than 5 degrees, more preferably equal to or greater than 7 degrees, and still more preferably equal to or greater than 10 degrees. In respect of setting the groove angle $\theta g2$ to the preferred value, the cutter angle $\theta g1$ is preferably equal to or less than 45 degrees, more preferably equal to or less than 40 degrees, and still more preferably equal to or less than 35 degrees.

In respect of the conformity to "the two circles method" to be described later, it is preferable that the curvature radius R1 of the cutter is 0.13 (mm) or greater and 0.33 (mm) or less when the cutter angle $\theta g1$ is 3 degrees or greater and 30 degrees or less. When the cutter of the preferred range is used, it is highly possible that the curvature radius R2 of the edge is 0.10 (mm) or greater and 0.30 (mm) or less and the groove angle $\theta g2$ is 3 degrees or greater and 30 degrees or less. The case where the curvature radius R2 of the edge is 0.10 (mm) or greater and 0.30 (mm) or less and the groove angle $\theta g2$ is 3 degrees or greater and 30 degrees or less tends to conform to "the two circles method" to be described later.

As described above, the present invention can effectively suppress the fluctuation in the section shape of the face line (groove). As a result, a head conforming to the rules related to the face line can be produced with high accuracy. Particularly, a head conforming to the new rules recently defined can be produced with high accuracy.

The rules related to the face line, including the new rules will be described later. In the description, FIG. 13 to FIG. 17 are suitably referred. The new rules were announced from R&A (Royal and Ancient Golf Club of Saint Andrews) on Aug. 5, 2008. The Japanese translation of the rules of the face line, including the new rules is posted in the homepage of JGA (Japan Golf Association). The address of the JGA homepage in which the Japanese translation is placed is "http://www.jga.or.jp/jga/html/jga_data/04KISOKU_NEWS/2008_KISOKU/GrooveMeasurementProcedureOutline(JP).pdf".

The rules are described in English in the rulebook (the 2009 edition) published by R&A (Royal and Ancient Golf Club of Saint Andrews) or the homepage of R&A. In the present application, the rules imply the rules defined by the R&A.

Hereinafter, the general description of the rules of the R&A will be described. Hereinafter, the same terms as the rules defined by R&A are used. Hereinafter, a face line is also merely referred to as "a groove".

[General Description of Rules of R&A Related to Face Line]

R&A gave a notification on Feb. 27, 2007. The notification proposed the change of Appendix II, 5c of the golf rules so that the capacity of a groove and the sharpness of an edge are restricted in all clubs except a driving club (a so-called driver) and a putter. The rules added to the proposal are the new rules. The new rules are scheduled to be effected from Jan. 1, 2010.

The new rule includes the following two additional matters related to the clubs other than the driving club and the putter.

(New Rule 1)

An value obtained by dividing an area A1 of a transverse plane of a groove by a pitch (width W1+distance S1) of the groove is restricted to 0.003 square inches/inches (0.0762 $mm^2$/mm).

(New Rule 2)

The sharpness of the edge of the groove is restricted to an effective minimum radius of 0.010 inches (0.254 mm).

The area A1, the width W1 and the distance S1 will be described later.

The parameter of the groove is calculated in the procedure related to the determination of the conformity of the groove to the rules. The outline of the calculation procedure for the parameter of the groove is described in the following items (1) and (2).

(1) Acquisition of Profile of Groove

In the acquisition of the groove profile, first, it is confirmed that deposits, paints, coatings, or the like are not present in an area to be measured. Next, a line perpendicular to a groove of a club face to be traced is determined. For example, the line is a line taken along a line DM-DM shown in FIG. 2. Measurement is carried out along the line. Examples of a measuring device include "INFINITE FOCUS optical 3D Measurement Device G4f" (trade name) manufactured by Alicona Imaging GmbH.

(2) 30 Degree Method of Measurement

"30 degree method of measurement" is applied for the profile of the measured groove. In the 30 degree method of measurement, contact points CP1 and CP2 of a tangent having an angle of 30 degrees relative to a land area LA and a groove are determined. A distance between the contact point CP1 and the contact point CP2 is defined as the width W1 of the groove (see FIG. 17).

Figure 17:
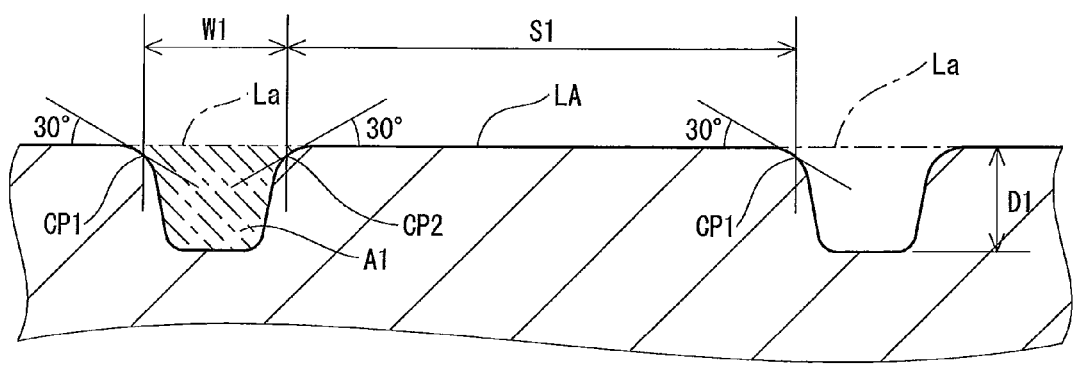
FIG. 17 is a diagram for explaining the golf rules related to a face line.

A distance between the contact point CP2 of the groove and the contact point CP1 of a groove next to the groove is defined as the distance S1 of the groove (see FIG. 17).

A distance between an extended line La of the land area LA and the lowest point of the section of the groove is defined as a depth D1 of the groove (see FIG. 17).

An area A1 of the groove is an area of a portion surrounded by the extended line La and the profile (section line) of the groove (see FIG. 17).

The rules of the golf club including the new rules will be described in the following items (3) to (9).

(3) Width W1 of Groove

For the width W1 of the groove, when 50% or more of the widths W1 of the measured grooves are more than 0.035 inches (0.889 mm), the club does not meet the rules. The rules are applied to all clubs except a putter.

When at least one of the widths W1 of the measured grooves is more than 0.037 inches (0.940 mm), the club does not meet the rules. The rules are applied to all the clubs except the putter.

(4) Depth of Groove

When 50% or more of depths D1 of the measured grooves are more than 0.020 inches (0.508 mm), the club does not meet the rules. When at least one of the depths D1 of the measured grooves is more than 0.022 inches (0.559 mm), the club does not meet the rules. The rules are applied to all the clubs except the putter.

(5) Distance between Grooves

When 50% or more of the distances S1 of the measured grooves are smaller than three times of the maximum width W1max of the measured adjacent grooves, the club does not meet the rules. When only one of the distances S1 of the measured grooves is smaller than a value obtained by subtracting 0.008 inches (0.203 mm) from 3 times of the maximum width W1max of the measured adjacent grooves, the club does not meet the rules. When 50% or more of the distances S1 of the measured grooves are smaller than 0.075 inches (1.905 mm), the club does not meet the rules. When at least one of the distances S1 of the measured grooves is smaller than 0.073 inches (1.854 mm), the club does not meet the rules. These rules are applied to all the clubs except the putter.

(6) Consistency of Groove

The range of width W1 of the measured groove (the difference between the maximum value and the minimum value) must not be more than 0.010 inches (0.254 mm). The range of the depth D1 of the measured groove (the difference between the maximum value and the minimum value) must not be more than 0.010 inches (0.254 mm). The grooves are symmetric, and mutually parallel. Furthermore, the grooves must be deliberately designed and manufactured so as to have consistency in an impact area. The rules are applied to all the clubs except the putter.

(7) [Area A1/(Width W1+Distance S1)]

When 50% or more of values of [A1/(W1+S1)] are more than 0.0030 inches (0.0762 mm), the club does not meet the rules. When the value of [A1/(W1+S1)] is more than 0.0032 inches (0.0813 mm) in at least one groove, the club does not meet the rules. The rules are applied to all the clubs except the driver and the putter.

(8) Radius of Edge

The rules for the roundness of the edge of the groove are defined by "two circles method" to be described later. When 50% or more of the edges of the upper side grooves or 50% or more of the edges of the lower side grooves do not satisfy the requirements for the two circles method, the club does not meet the rules. However, as described later, an angle of 10 degrees is allowable. When at least one of the edges of the grooves is projected by more than 0.0003 inches (0.0076 mm) out of the outer side circle, the club does not meet the rules. The rules are applied to a club having a loft angle (real loft angle) which is equal to or greater than 25 degrees. More specifically, the rules are applied to all clubs advertised, marked, and measured as the loft angle (real loft angle) which is equal to or greater than 25 degrees.

(9) Two Circles Method

Usually, a side wall of a groove is brought into contact with a land area LA by filleted transition. In order to determine whether such an edge is excessively sharp, a circle having a radius of 0.010 inches is drawn so that the circle contacts a side wall ml of the groove and the land area LA adjacent to the side wall ml (see FIGS. 13 to 16). Next, a second circle having a radius of 0.011 inches is drawn. The circle having the radius of 0.011 inches is a concentric circle of the circle having the radius of 0.010 inches (see FIGS. 13 to 16).

Figure 13:
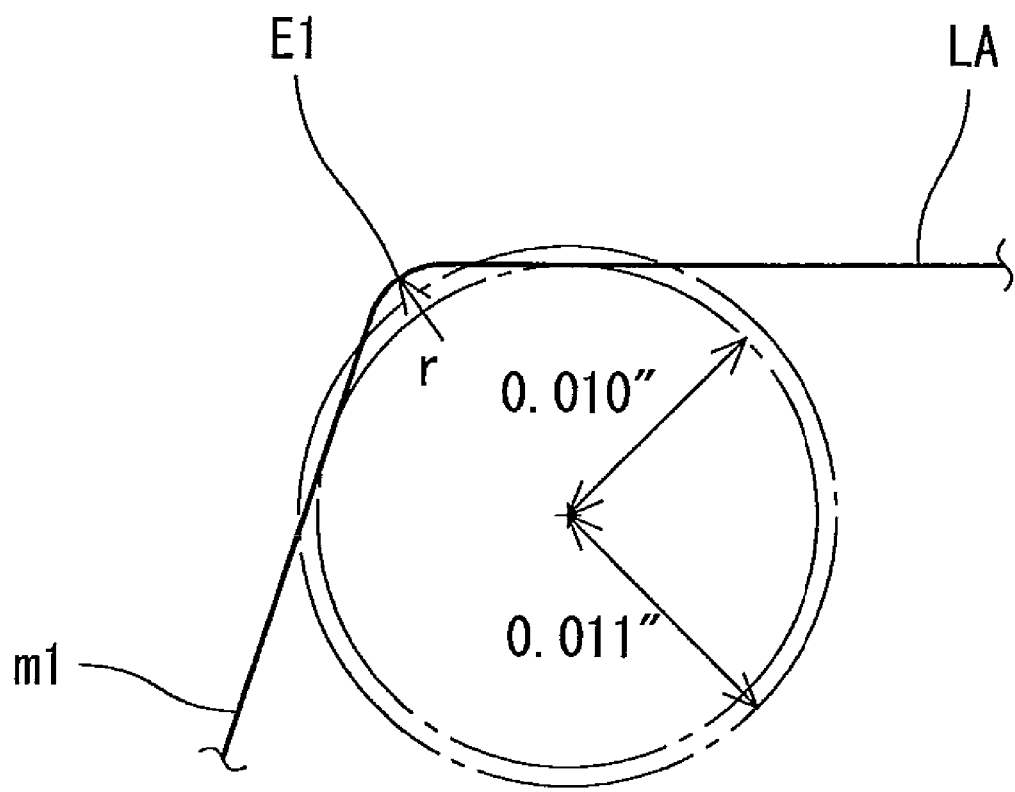
FIG. 13 is a diagram for explaining the two circles method of the golf rules.
Figure 14:
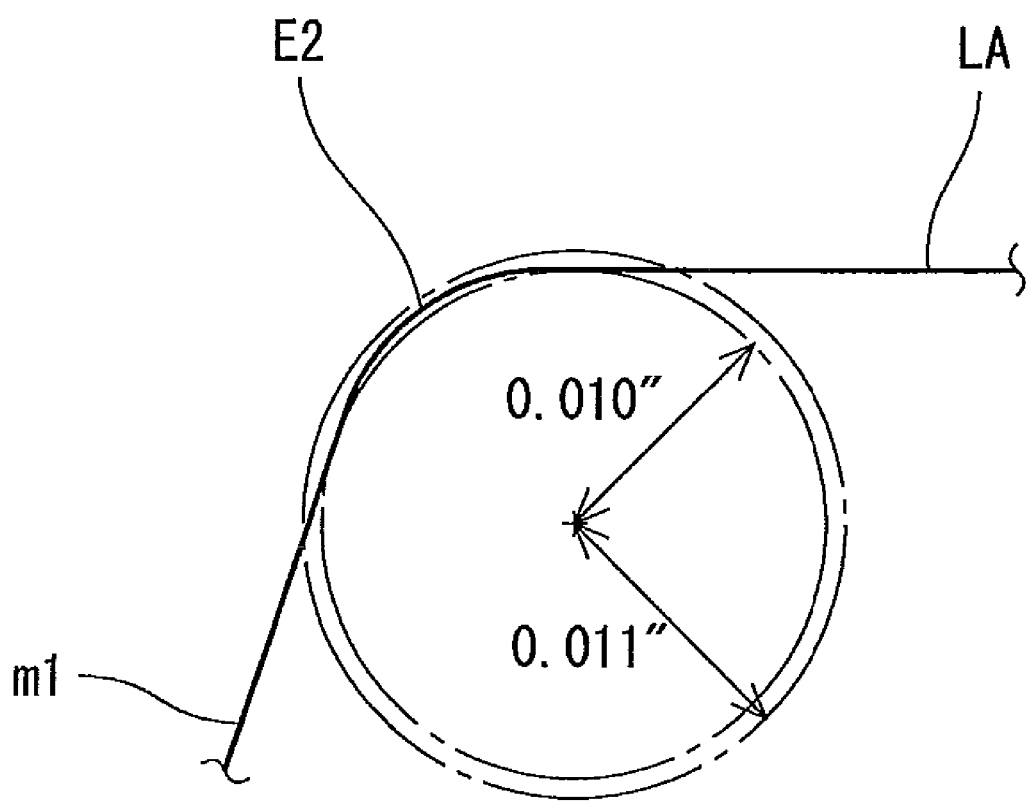
FIG. 14 is a diagram for explaining the two circles method of the golf rules.

When any portion of the edge of the groove is projected from the outer side circle (the circle having the radius of 0.011 inches), the edge of the groove is considered to be excessively sharp. An edge E1 of FIG. 13 is an example of the excessively sharp edge. Since the edge E2 of FIG. 14 is not projected from the outer side circle, the edge E2 is not considered to be excessively sharp.

The following two additional standards 1 and 2 are used in order to confirm that a certain groove is actually projected from the outer side circle and the projection is neither an artificial result during measurement nor manufacturing abnormalities, and to determine the conformity to the two circles method.

[Additional Standard 1: Range of Projection Angle from Outer Side Circle]

Figure 15:
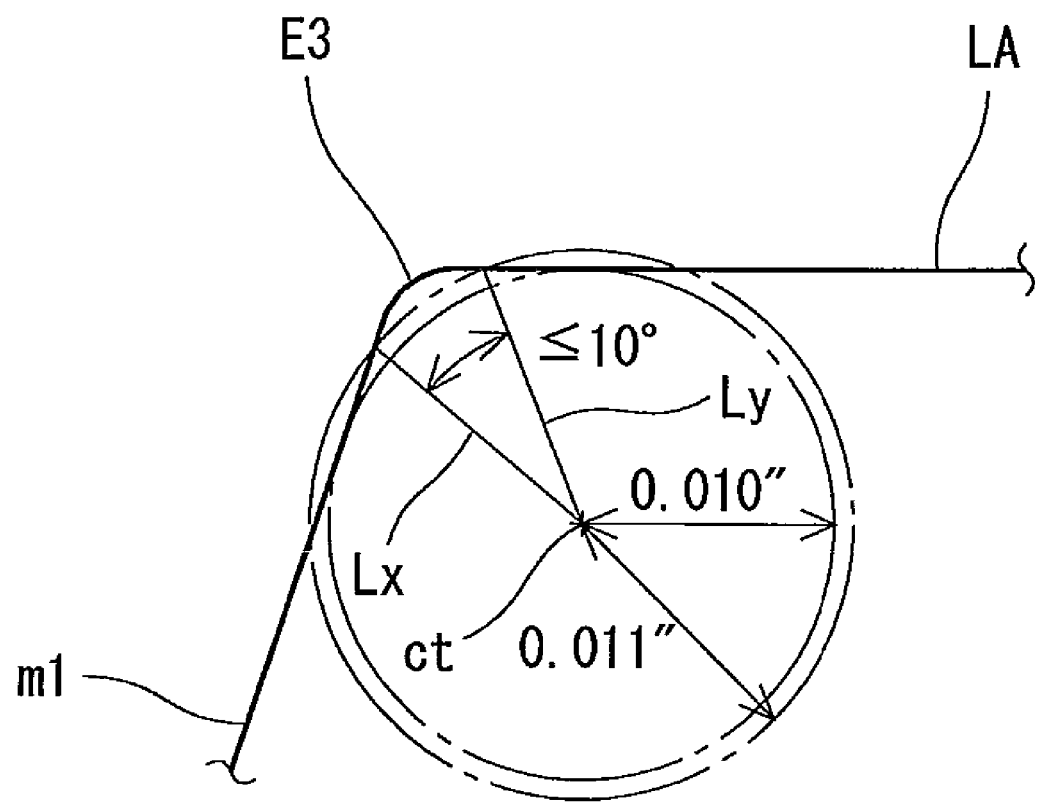
FIG. 15 is a diagram for explaining the two circles method of the golf rules.

As shown in FIG. 15, two lines Lx and Ly connecting a center ct of a concentric circle to a position at which an edge is projected from an outer side circle are drawn. An angle between the two lines Lx and Ly is a projection angle. When the projection angle is greater than 10 degrees in 50% or more of the edges of the upper side grooves or 50% or more of the edges of the lower side grooves, the club does not meet the rules.

[Additional Standard 2: Maximum Projection]

Figure 16:
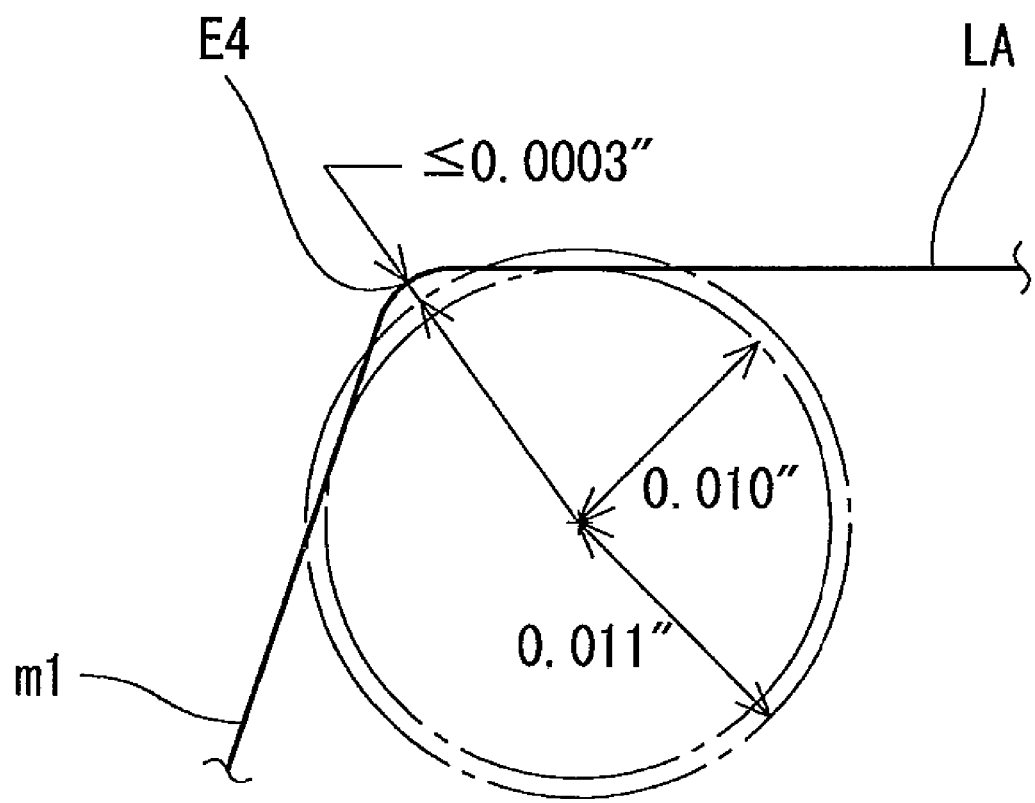
FIG. 16 is a diagram for explaining the two circles method of the golf rules.

When at least one of the edges is projected by more than 0.0003 inches out of the outer side circle as shown by an edge E4 of FIG. 16, the club does not meet the rules.

[The Rules R&A are Described Above]

As described above, the rigid rules related to the face line of the golf club are present. The present invention enhances the accuracy of the shape of the face line. The enhancement in the accuracy can contribute the production of the head conforming to the rules, with high accuracy. The present invention is useful for producing the head close to the limit of the standard on the rules. The present invention is effective for suppressing the fluctuation in the shape of the face line in the head mass-produced.

EXAMPLES

Hereinafter, the effects of the present invention will be clarified by examples. However, the present invention should not be interpreted in a limited way based on the description of the examples.

Example 1

A face plate used for an iron type golf club head was prepared. The face plate has a plate shape. The face plate is made of a titanium alloy. The face plate is used by being combined with a head body having a face part having an opening. Specifically, the face plate is fitted into the opening to produce a golf club head.

Cut processing of a face line was carried out in the same manner as in the head 2 except that the face plate was used in place of the head 2p of FIG. 3. The shape of a cutter was set as shown in FIGS. 4 and 5. A curvature radius R1 of a recessed curved surface of the cutter was 0.24 mm (constant). An cutter angle $\theta g1$ and a groove angle $\theta g2$ were set to 20 degrees. A width Wp of an upper side plane part was set to 0.5 mm. A position in the vertical direction of a cutter 12 was set so that a second straight part c5 is brought into contact with a land area LA. More specifically, the position in the vertical direction (a position of a central axis line z1 direction) of the cutter 12 was set so as that a condition during cut processing was set as shown in FIG. 7. The position was set by input into an NC processing machine. Next, the cutter 12 was moved while the cutter 12 was rotated according to the previously set program of the NC processing machine. Therefore, a face plate in which face lines shown in FIG. 2 were formed was obtained.

A section shape was measured at a central position in a toe-heel direction of the face line. More specifically, measurement was carried out at a position of line DM-DM in FIG. 2. Nine face lines were measured per head. Therefore, nine measured values were obtained per head. "INFINITE FOCUS optical 3D Measurement Device G4f" (trade name) manufactured by Alicona Imaging GmbH was used for the measurement. Four face plates according to example 1 were produced, and each of the face plates was measured. Therefore, 36 measured values in total were obtained. In one face line, the curvature radius R2 of the edge is measured in each of both right and left sides. More specifically, two data of the curvature radius R2 of the edge are obtained per face line. Therefore, 72 data of the curvature radius R2 of the edge were obtained by the measurement. The maximum values and the minimum values are shown in the column of "fluctuation (the minimum value to the maximum value) of curvature radius R2" of the following Table 1. The specification and the evaluation result of the face line of example 1, including the data are shown in the following Table 1.

Example 2

A face line according to example 2 was obtained in the same manner as in the example 1 except that a curvature radius R1 of a cutter was set to 0.30 (mm) and the other specifications were set as shown in Table 1. The specification and the evaluation result of the example 2 are shown in the following Table 1.

Comparative Example 1

Figure 11:
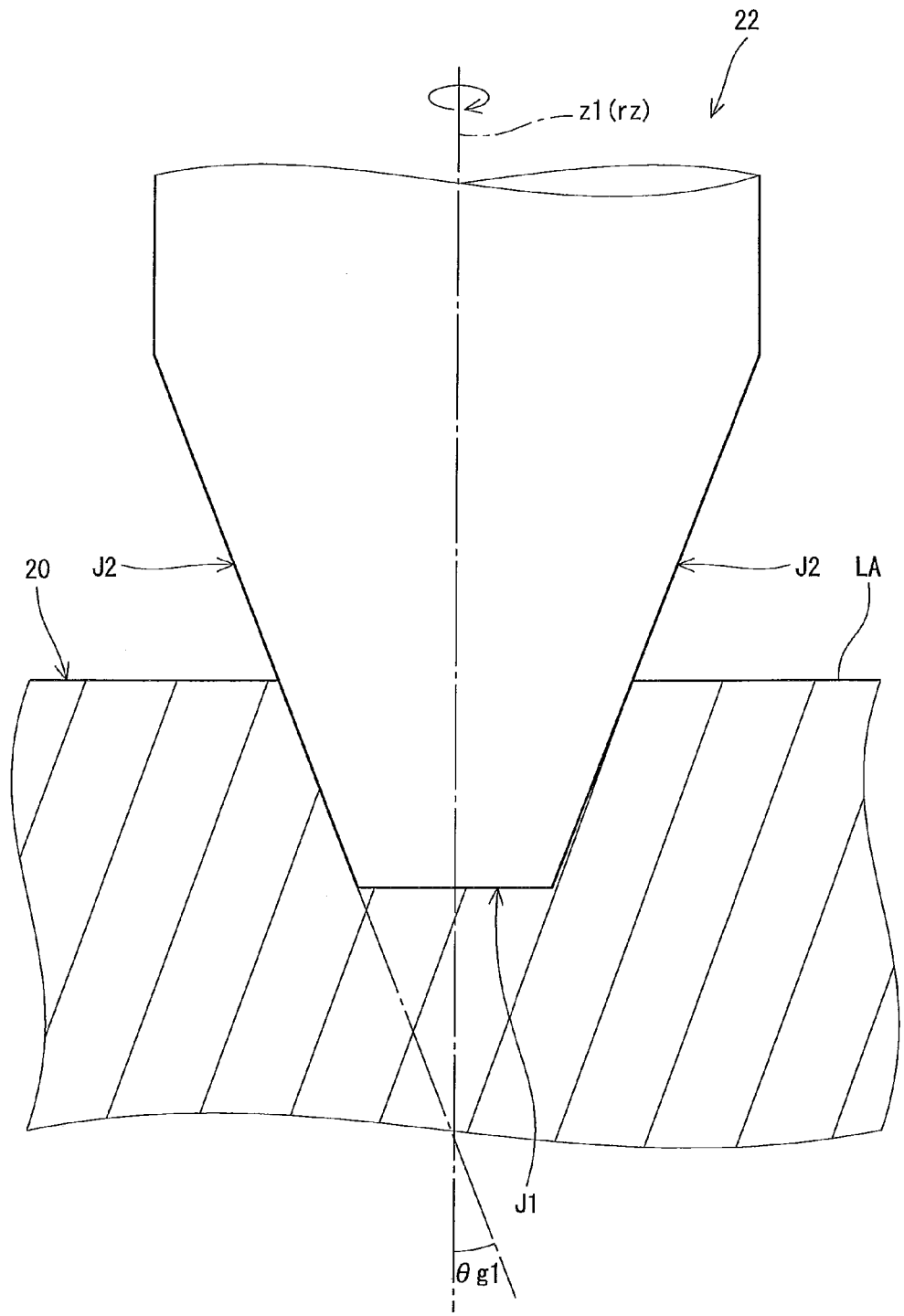
FIG. 11 is a partial sectional view showing an embodiment of cut processing in a comparative example.

FIG. 11 is a partial sectional view showing a condition in which a face line 24 is formed on a face 20 of comparative example 1 by cut processing. In the comparative example 1, the cutting surface of a cutter 22 does not have a recessed curved surface. The cutting surface of the cutter 22 has a bottom surface J1 and a conical surface J2. The cutting surface of the cutter 22 is constituted by only the bottom surface J1 and the conical surface J2. The bottom surface J1 is a circular plane. A central axis line z1 of the cutter 22 passes through the center of the bottom surface J1. The bottom surface J1 is a plane perpendicular to the central axis line z1. The section shape of the conical surface J2 is a straight line. The straight line is a generating line of the conical surface J2. In the cutter 22, an cutter angle $\theta g1$ and a groove angle $\theta g2$ were set to 20 degrees.

Figure 12:
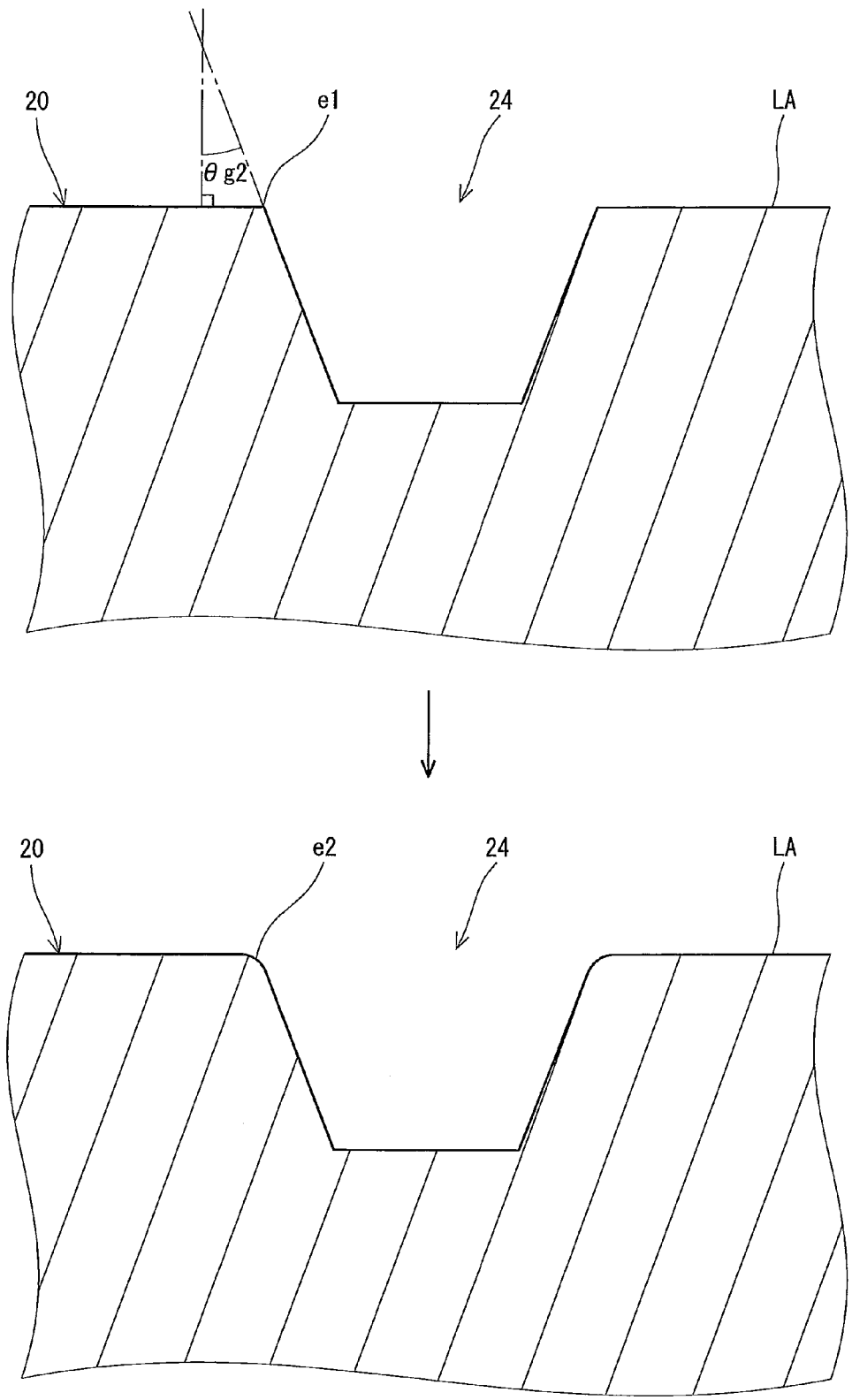
FIG. 12 is a diagram for explaining a processing procedure of an edge in the comparative example.

FIG. 12 is a view for explaining the step of the comparative example 1. An upper side view of FIG. 12 is a sectional view of a face line 24 formed by cut processing by the cutter 22. Immediately after the cut processing, an edge e1 of the face line 24 had no roundness.

Next, polishing (buffing) was carried out in order to apply a roundness to the edge e1 of the face line 24. A wire buff was used as polishing for applying the roundness. In the wire buff, a brush having a disk shape as a whole was used. The buffing was carried out by forcing the face surface on the peripheral face of the disk-shaped brush while the brush was rotated. In the disk-shaped brush, a large number of wires extending toward the outer side of the radial direction from the center of the brush are planted. The set of the end faces of the large number of wires forms the peripheral face of the brush. The face surface was attached to the peripheral face of the brush to carry out wire buffing while the brush is rotated at 1500 rpm. A roundness was applied to the edge e1 by the wire buffing. More specifically, the edge e1 (see the upper side view of FIG. 12) having no roundness was processed to the edge e2 (see the lower side view of FIG. 12) having a roundness by the wire buffing. Thus, a face line according to the comparative example 1 was obtained. The specification and the evaluation result of the comparative example 1 are shown in the following Table 1.

Comparative Example 2

A cutter having the shape of FIG. 11 was used as in the comparative example 1. A face line according to comparative example 2 was obtained in the same manner as in the comparative example 1 except that an cutter angle $\theta g1$ and a groove angle $\theta g2$ were set to 10 degrees and the other specifications were set as shown in Table 1. The specification and the evaluation result of the comparative example 2 are shown in the following Table 1.

TABLE 1

Specifications and Evaluation Results of Examples and Comparative Example

| | Design value (desired value) of curvature radius R2 of edge (mm) | Cutter | | Fluctuation in | | | | | | |
|---|---|---|---|---|---|---|---|---|---|---|
| | | Shape | Curvature radius R1 of recessed curved surface of cutter (mm) | Processing for rounding edge after processing by cutter | curvature radius R2 (the minimum value to the maximum value) (mm) | Width of fluctuation in curvature radius R2 (mm) | Conformity to the rules | $\theta g1$ (degree) | $\theta g2$ (degree) | Groove width W1 (mm) | Groove depth D1 (mm) |
| Example 1 | 0.20 | FIGS. 4, 5 | 0.24 | None | 0.16~0.20 | 0.04 | Good | 20 | 20 | 0.70 | 0.40 |
| Example 2 | 0.25 | FIGS. 4, 5 | 0.30 | None | 0.20~0.25 | 0.05 | Good | 10 | 10 | 0.70 | 0.40 |
| Comparative example 1 | 0.20 | FIG. 11 | None | Wire buff | 0.05~0.25 | 0.20 | Poor | 20 | 20 | 0.70 | 0.40 |
| Comparative example 2 | 0.25 | FIG. 11 | None | Wire buff | 0.10~0.30 | 0.20 | Poor | 10 | 10 | 0.70 | 0.40 |

[Valuation Method of Groove Width W1, Groove Depth D1, and Groove Angle θg2]

A groove width W1, a groove depth D1, and a groove angle θg2 were measured using a section line obtained by "INFINITE FOCUS optical 3D Measurement Device G4f" (trade name, manufactured by Alicona Imaging GmbH) described above. These values shown in Table 1 are an average value. The groove width W1 and the groove depth D1 were measured based on the rules of R&A described above.

[Valuation Method of Conformity to Rules]

Evaluation was carried out by using the section line obtained by "INFINITE FOCUS optical 3D Measurement Device G4f" described above. All the measured edges were evaluated based on "the two circles method" described above. As shown in FIG. 14, a condition in which an edge was set between a circle having a radius of 0.010 inches and a circle having a radius of 0.011 inches was determined as "pass". As shown in FIG. 15, a case where an edge is projected outward relative to the outer side circle (a radius of 0.011 inches) was determined as "failure". A case where all the measured edges are determined as "pass" is described as "good" in Table 1. A case where at least one of all the measured edges is determined as "failure" is described as "poor" in Table 1. In the example 1 and the example 2, all the measured edges were determined as "pass".

As shown in Table 1, the manufacturing methods of the examples have higher evaluation than that of the comparative example. The fluctuation in the curvature radius R2 of the edge in the examples is smaller than that in the comparative example. Advantages of the present invention are clearly indicated by these evaluation results. The results of the examples 1 and 2 confirmed that the average value of the curvature radii R2 of the edges is smaller than the curvature radius R1 of the cutter. Therefore, the validity of setting the curvature radius R1 of the cutter larger than the design value (desired value) of the curvature radius R2 of the edge was confirmed.

The method described above can be applied to the golf club head having the face line. The present invention can be used for an iron type golf club head, a wood type golf club head, a utility type golf club head, a hybrid type golf club head, a putter type golf club head, and the like.

The description hereinabove is merely for an illustrative example, and various modifications can be made in the scope not to depart from the principles of the present invention.

What is claimed is:

1. A manufacturing method for a golf club head, comprising the steps of:
    preparing a pre-line forming member having a face surface and no face line; and
    cutting the face surface of the pre-line forming member using a cutter to form a face line on the pre-line forming member with the uncut face surface constituting a land area portion,
    wherein the cutter has a tip part having a cutting surface;
    the cutting surface has a recessed curved surface below an upper side plane portion;
    an edge of the face line is cut by the recessed curved surface; and
    during the step of cutting, a clearance is maintained between the upper side plane portion and the land area portion.

2. The manufacturing method according to claim 1, wherein the step of cutting is carried out by axial rotation of the cutter;
    the cutting surface has a plane part formed on an upper side of the recessed curved surface; and
    the upper side plane part is perpendicular to a rotation axis of the cutter.

3. The manufacturing method according to claim 1, wherein the step of cutting is carried out by axial rotation of the cutter; and
    the cutting surface has a conical surface formed on a lower side of the recessed curved surface.

4. The manufacturing method according to claim 3, wherein the step of cutting is carried out by axial rotation of the cutter; and
    an angle θg1 between a line perpendicular to a land area and a generating line of the conical surface is 5 degrees or greater and 45 degrees or less in the step of cutting.

5. The manufacturing method according to claim 1, wherein the step of cutting is carried out by axial rotation of the cutter;
    the cutting surface has a bottom surface; and
    the bottom surface is a plane perpendicular to a rotation axis of the cutter.

6. The manufacturing method according to claim 1, wherein a curvature radius R1 of a section of the recessed curved surface is 0.06 mm or greater and 0.48 mm or less.

7. The manufacturing method according to claim 1, wherein when a curvature radius of a section of the recessed curved surface is defined as R1 (mm) and a curvature radius of the edge of the face line is defined as R2 (mm), the curvature radius R1 is greater than the curvature radius R2.

8. The manufacturing method according to claim 2, wherein a width Wp of the upper side plane part is 0.1 mm or greater and 5 mm or less.

9. The manufacturing method according to claim 1, wherein when an axial-directional distance of a side surface of the cutter is defined as Ha (mm) and a axial-directional distance between a tip of the cutter and a land area during cut processing is defined as Hb (mm), a ratio (Hb/Ha) is equal to or greater than 0.8.

10. The manufacturing method according to claim 2, wherein when an axial-directional distance of a side surface of the cutter is defined as Ha (mm) and an axial-directional distance between a tip of the cutter and a land area during cut processing is defined as Hb (mm), a difference (Ha-Hb) serves as a reference for positioning of the cutter.

11. The manufacturing method according to claim 2, wherein cut processing is carried out with the upper side plane part abutting on the land area.

12. The manufacturing method according to claim 3, wherein when an axial directional length of the conical surface is defined as h3 (mm) and a depth of the face line is defined as D1 (mm), a ratio (h3/D1) is 0.4 or greater and 0.9 or less.

13. The manufacturing method according to claim 1, wherein a curvature radius R2 of an edge of the face line is 0.02 mm or greater and 0.44 mm or less.

14. The manufacturing method according to claim 13, wherein the curvature radius R2 of the edge is constant or varied.

15. The manufacturing method according to claim 7, wherein a difference (R1-R2) between the curvature radius R1 (mm) and the curvature radius R2 (mm) is 0.01 mm or greater and 0.06 mm or less.

16. The manufacturing method according to claim 1, wherein the edge is formed by the recessed curved surface of the cutter; and a step of rounding the edge is not carried out after cut processing by the cutter.

* * * * *